(12) United States Patent
Shimada

(10) Patent No.: US 12,117,836 B2
(45) Date of Patent: Oct. 15, 2024

(54) CONTROL METHOD, NON-TRANSITORY STORAGE MEDIUM, MOVER SYSTEM, AND PARTS MOUNTING SYSTEM

(71) Applicant: Panasonic Intellectual Property Management Co., Ltd., Osaka (JP)

(72) Inventor: Hideaki Shimada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 310 days.

(21) Appl. No.: 17/455,961

(22) Filed: Nov. 22, 2021

(65) Prior Publication Data

US 2022/0179422 A1    Jun. 9, 2022

(30) Foreign Application Priority Data

Dec. 4, 2020  (JP) .................................. 2020-202311

(51) Int. Cl.
  *G05D 1/02*   (2020.01)
  *G05D 1/00*   (2006.01)

(52) U.S. Cl.
  CPC .................................. *G05D 1/0212* (2013.01)

(58) Field of Classification Search
  CPC . B62D 5/04; B62D 6/001; G05D 1/02; G05D 1/0212; G05D 1/0265; G05D 2201/0216
  USPC ......................................................... 701/26
  See application file for complete search history.

(56) References Cited

U.S. PATENT DOCUMENTS

| | | | | |
|---|---|---|---|---|
| 5,554,969 A | * | 9/1996 | Eguchi | B62D 15/0225 |
| | | | | 180/404 |
| 5,913,376 A | * | 6/1999 | Takei | G05D 1/0261 |
| | | | | 701/26 |
| 9,783,011 B2 | * | 10/2017 | Taki | B60C 23/0489 |
| 9,796,421 B1 | * | 10/2017 | Gupta | B60W 40/103 |
| 11,016,489 B2 | * | 5/2021 | Liu | G05D 1/0088 |
| 11,167,751 B2 | * | 11/2021 | Liu | B60W 10/04 |
| 2021/0316975 A1 | * | 10/2021 | Yeo | G01S 17/08 |
| 2022/0363276 A1 | * | 11/2022 | Wulf | B60W 50/029 |

FOREIGN PATENT DOCUMENTS

JP      2002-039786 A    2/2002

* cited by examiner

*Primary Examiner* — Andrew Joseph Rudy
(74) *Attorney, Agent, or Firm* — Pearne & Gordon LLP

(57) ABSTRACT

A control method includes a first turning step and a second turning step. The first turning step includes controlling a plurality of drive wheels to make a mover turn around a position where a first detection range overlaps with a trajectory, until a second sensor senses, in a state where the first detection range overlaps with the trajectory, a state where the trajectory is present at a first target position within a second detection range. The second turning step includes controlling, after the first turning step has been performed, the plurality of drive wheels to make the mover turn around the first target position until the third sensor senses a state where the trajectory is present at a second target position within a third detection range.

20 Claims, 14 Drawing Sheets

CONTROL METHOD, NON-TRANSITORY STORAGE MEDIUM, MOVER SYSTEM, AND PARTS MOUNTING SYSTEM

CROSS-REFERENCE TO RELATED APPLICATIONS

The present application is based upon, and claims the benefit of priority to, Japanese Patent Application No. 2020-202311, filed on Dec. 4, 2020, the entire contents of which are hereby incorporated by reference.

TECHNICAL FIELD

The present disclosure generally relates to a control method, a non-transitory storage medium, a mover system, and a parts mounting system, and more particularly relates to a control method that uses a mover moving on a traveling surface, a non-transitory storage medium, a mover system, and a parts mounting system.

BACKGROUND ART

JP 2002-039786 A discloses an unmanned carrier vehicle (mover). This unmanned carrier vehicle includes two steered wheels (drive wheels) to turn as a traveling motor is driven. This unmanned carrier vehicle moves in a desired moving direction by having the two steered wheels turned by a steering motor.

SUMMARY

The present disclosure provides a control method, a non-transitory storage medium, a mover system, and a parts mounting system, all of which are configured or designed to improve the alignment accuracy of a mover.

A control method according to an aspect of the present disclosure is a method for controlling a mover configured to move on a traveling surface. The mover includes a plurality of sensors and a plurality of drive wheels. A first sensor, selected from the plurality of sensors, detects, when a first detection range overlaps with a trajectory, a position of the trajectory within the first detection range. The trajectory is provided on the traveling surface to guide the mover. A second sensor, selected from the plurality of sensors and different from the first sensor, detects, when a second detection range overlaps with the trajectory, a position of the trajectory within the second detection range. A third sensor, selected from the plurality of sensors and different from the second sensor, detects, when a third detection range overlaps with the trajectory, a position of the trajectory within the third detection range. The control method includes a first turning step and a second turning step. The first turning step includes controlling the plurality of drive wheels to make the mover turn around a position where the first detection range overlaps with the trajectory until the second sensor senses, in a state where the first detection range overlaps with the trajectory, a state where the trajectory is present at a first target position within the second detection range. The second turning step includes controlling, after the first turning step has been performed, the plurality of drive wheels to make the mover turn around the first target position until the third sensor senses a state where the trajectory is present at a second target position within the third detection range.

A program according to another aspect of the present disclosure is designed to cause one or more processors to perform the control method described above.

A non-transitory storage medium according to still another aspect of the present disclosure stores thereon a program designed to cause one or more processors to perform the control method described above.

A mover system according to still another aspect of the present disclosure includes a mover and a control unit. The mover includes a plurality of sensors and a plurality of drive wheels. The control unit controls the plurality of drive wheels to make the mover move on a traveling surface. A first sensor, selected from the plurality of sensors, detects, when a first detection range overlaps with a trajectory, a position of the trajectory within the first detection range. The trajectory is provided on the traveling surface to guide the mover. A second sensor, selected from the plurality of sensors and different from the first sensor, detects, when a second detection range overlaps with the trajectory, a position of the trajectory within the second detection range. A third sensor, selected from the plurality of sensors and different from the second sensor, detects, when a third detection range overlaps with the trajectory, a position of the trajectory within the third detection range. The control unit performs a first turning step and a second turning step. The first turning step includes controlling the plurality of drive wheels to make the mover turn around a position where the first detection range overlaps with the trajectory until the second sensor senses, in a state where the first detection range overlaps with the trajectory, a state where the trajectory is present at a first target position within the second detection range. The second turning step includes controlling, after the first turning step has been performed, the plurality of drive wheels to make the mover turn around the first target position until the third sensor senses a state where the trajectory is present at a second target position within the third detection range.

A parts mounting system according to yet another aspect of the present disclosure includes the mover system described above and at least one parts mounter. The parts mounter mounts parts onto a board. The parts mounter includes: a parts feeder to feed the parts; and a mounter body including a mount head. The mount head mounts the parts, fed from the parts feeder, onto the board. The parts feeder is carried to the mounter body as the mover of the mover system moves along the trajectory.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Embodiment

A control method, program, mover system, and parts mounting system according to an embodiment will now be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

Overview

Figure 1:
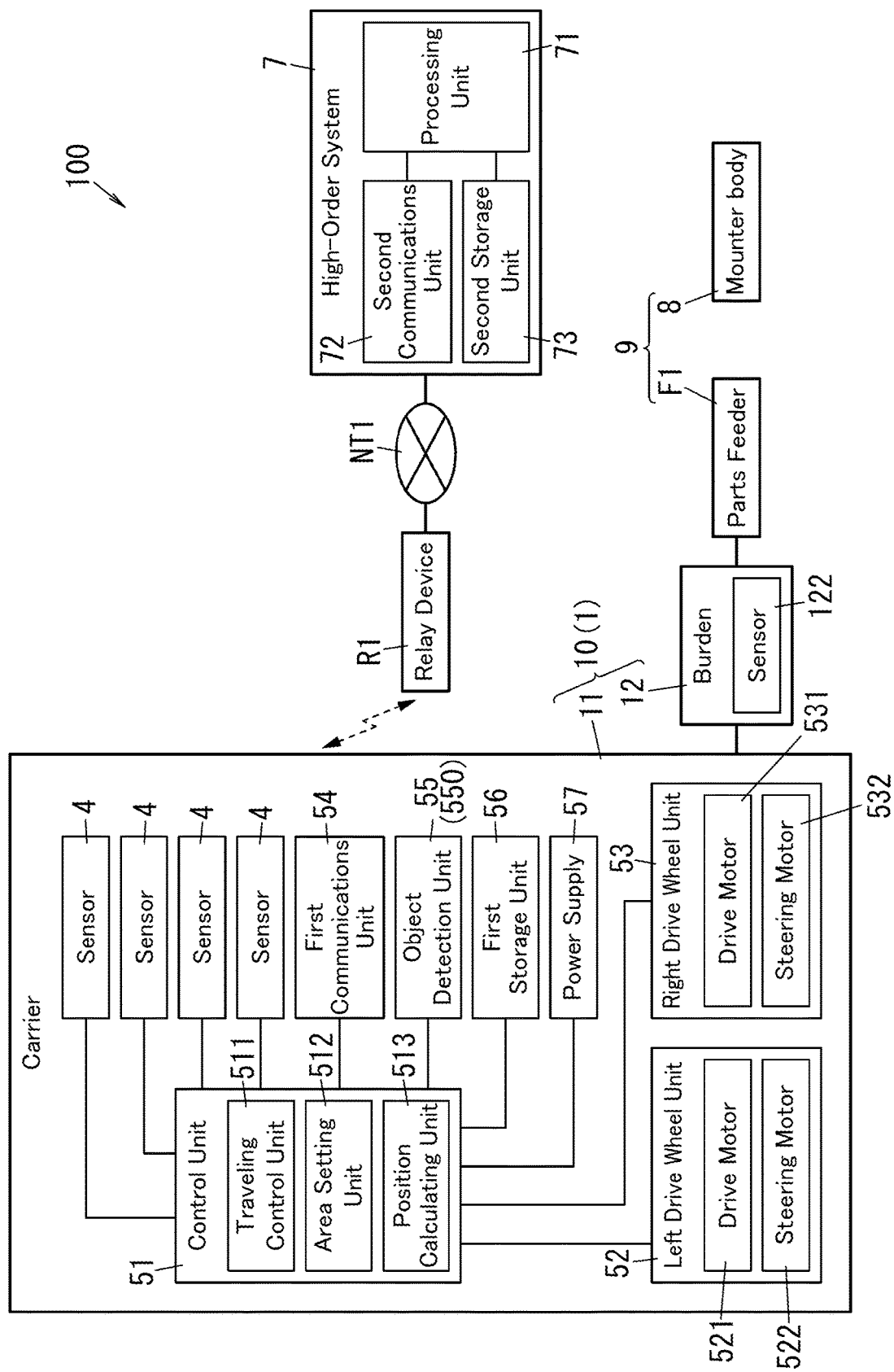
FIG. 1 is a block diagram of a control system including a mover system according to an exemplary embodiment.

A control method according to an exemplary embodiment is performed by a control system 100 (see FIG. 1). As shown in FIG. 1, the control system 100 includes a mover system 10 and a high-order system 7. The mover system 10 includes a mover 1. The mover 1 moves on a traveling surface B1 (see FIG. 2). The control method is a method for controlling the mover 1 (see FIG. 2) to make the mover 1 follow a trajectory L1 (see FIG. 2).

The mover 1 may be introduced into various types of facilities, examples of which include distribution centers (including shipping centers), factories, offices, stores, schools, and hospitals. The traveling surface B1 is surface on which the mover 1 moves. When the mover 1 moves indoors, the traveling surface B1 may be the floor surface of a facility, for example. On the other hand, when the mover 1 moves outdoors, the traveling surface B1 may be the ground, for example. In the following description, a situation where the mover 1 is used in a factory will be described as an example. Note that illustration of the traveling surface B1 is omitted from all drawings but FIG. 2.

Figure 2:
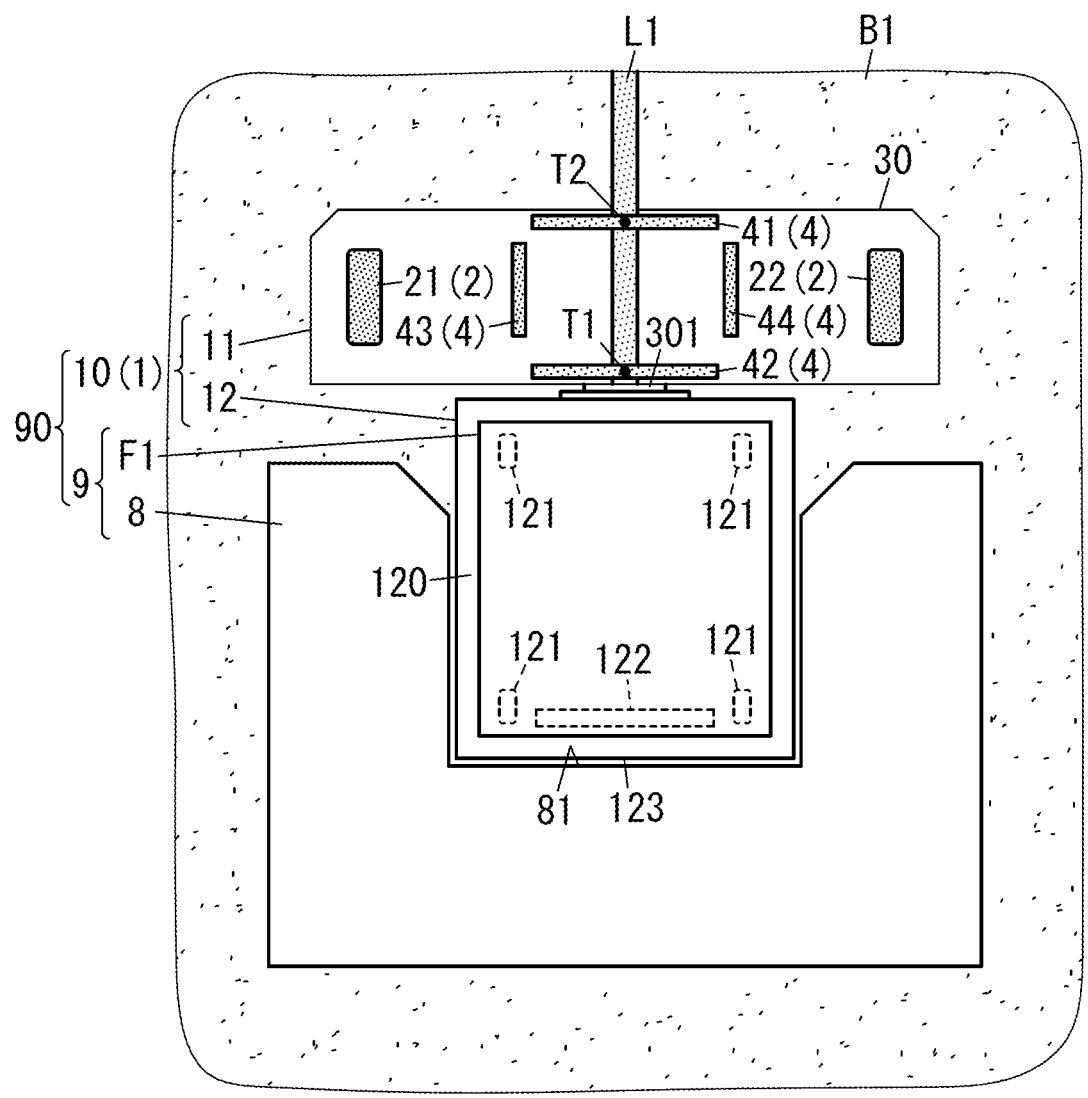
FIG. 2 is a plan view of a parts mounting system including the mover system.
Figure 2:
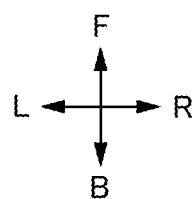

A control method according to this embodiment is a method for controlling a mover 1 moving on the traveling surface B1. As shown in FIG. 2, the mover 1 includes a plurality of sensors 4 and a plurality of drive wheels 2. A first sensor, selected from the plurality of sensors 4, detects, when a first detection range overlaps with the trajectory L1, the position of the trajectory L1 within the first detection range. The trajectory L1 is provided on the traveling surface B1 to guide the mover 1. A second sensor, selected from the plurality of sensors 4 and different from the first sensor, detects, when a second detection range overlaps with the trajectory L1, the position of the trajectory L1 within the second detection range. A third sensor, selected from the plurality of sensors 4 and different from the second sensor, detects, when a third detection range overlaps with the trajectory L1, the position of the trajectory L1 within the third detection range.

Figure 3:
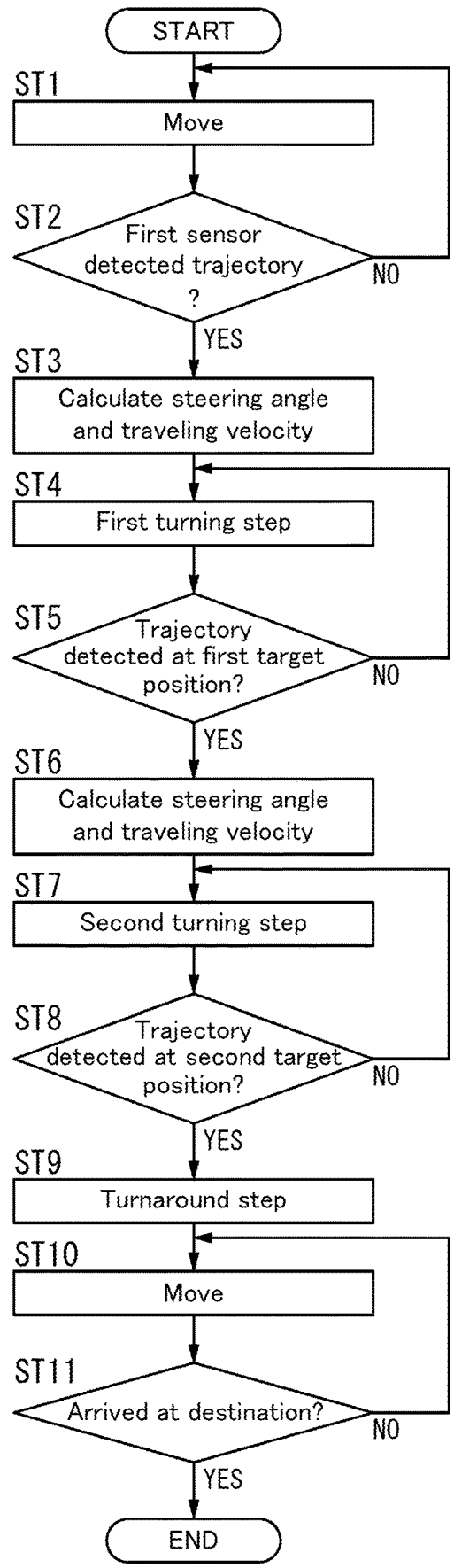
FIG. 3 is a flowchart showing an exemplary operation of the mover system.

As shown in FIG. 3, the control method includes a first turning step (Step ST4) and a second turning step (Step ST7). The first turning step includes controlling the plurality of drive wheels 2 to make the mover 1 turn around a position P1 (see FIG. 4) where the first detection range overlaps with the trajectory L1 until the second sensor senses, in a state where the first detection range overlaps with the trajectory L1, a state where the trajectory L1 is present at a first target position T1 (see FIG. 4) within the second detection range. The second turning step includes controlling, after the first turning step has been performed, the plurality of drive wheels 2 to make the mover 1 turn around the first target position T1 until the third sensor senses a state where the trajectory L1 is present at a second target position T2 (see FIG. 4) within the third detection range.

In the control method according to this embodiment, the mover 1 is roughly aligned through the first turning step and then aligned more finely through the second turning step. This may improve the alignment accuracy of the mover 1 with respect to the trajectory L1, compared to attempting to align the mover 1 by turning the mover 1 only once.

In the first turning step, the second sensor is aligned with respect to the trajectory L1. In the second turning step, the third sensor is aligned with respect to the trajectory L1. Performing both the first turning step and the second turning step allows the orientation of the mover 1 to turn into a desired orientation.

As used herein, the phrase "the mover 1 turns" refers to both a situation where the mover 1 changes its orientation while traveling either forward or backward and a situation where the mover 1 just changes its orientation without traveling forward or backward. In the first turning step and the second turning step, the mover 1 just changes its orientation without traveling forward or backward.

The control method described above may be implemented as, for example, either a (computer) program or a non-transitory storage medium that stores the program thereon. A program according to an aspect is designed to cause one or more processors to perform the control method described above.

Also, as shown in FIGS. 1 and 2, a mover system 10 includes a mover 1 and a control unit 51. The mover 1 includes a plurality of sensors 4 and a plurality of drive wheels 2. The control unit 51 controls the plurality of drive wheels 2 to make the mover 1 move on a traveling surface B1. A first sensor, selected from the plurality of sensors 4, detects, when a first detection range overlaps with a trajectory L1, the position of the trajectory L1 within the first detection range. The trajectory L1 is provided on the traveling surface B1 to guide the mover 1. A second sensor, selected from the plurality of sensors 4 and different from the first sensor, detects, when a second detection range overlaps with the trajectory L1, the position of the trajectory L1 within the second detection range. A third sensor, selected from the plurality of sensors 4 and different from the second sensor, detects, when a third detection range overlaps with the trajectory L1, the position of the trajectory L1 within the third detection range. The control unit 51 performs the first turning step and the second turning step described above.

The mover system 10 according to this embodiment may improve the alignment accuracy of the mover 1 with respect to the trajectory L1.

As shown in FIG. 2, the mover system 10 may be used in a parts mounting system 90. In other words, the parts mounting system 90 includes the mover system 10. The parts mounting system 90 further includes at least one (e.g., one in the example illustrated in FIG. 2) parts mounter 9. The parts mounter 9 mounts parts onto a board. The parts mounter 9 includes a parts feeder F1 and a mounter body 8. The parts feeder F1 feeds the parts. The mounter body 8 includes a mount head to mount the parts, fed from the parts feeder F1, onto the board. The parts feeder F1 is carried to the mounter body 8 as the mover 1 of the mover system 10 moves along the trajectory L1.

Adopting the mover system 10 in the parts mounting system 90 allows the mover 1 to carry the parts feeder F1 to the mounter body 8 more easily.

(Details)

(1) Overall Configuration

A control system 100 according to this embodiment will be described with reference to FIGS. 1 and 2.

The control system 100 includes not only the mover system 10 and the high-order system 7 but also a relay device R1 and the parts mounter 9 described above.

(2) Mover System (2.1) Overview of Mover System

The mover 1 of the mover system 10 moves on the traveling surface B1 and the control unit 51 of the mover system 10 controls the movement of the mover 1. The control unit 51 may form part of the mover 1. Alternatively, a device playing the role of the mover 1 and a device playing the role of the control unit 51 may be provided separately from each other and communicate with each other such that the movement of the mover 1 is controlled by the control unit 51. In this embodiment, the control unit 51 forms part of the mover 1. That is to say, the control unit 51 is installed in the body 30 of the mover 1. The mover system 10 consists of the mover 1 alone. The mover 1 includes a burden 12 and a carrier 11.

As shown in FIG. 2, the carrier 11 includes the body 30 and plurality of (e.g., two in the example illustrated in FIG. 2) drive wheels 2. The plurality of drive wheels 2 are held by the body 30. The plurality of drive wheels 2 is made up of a first wheel 21 and a second wheel 22. That is to say, the mover 1 is configured to move on the traveling surface B1 on the two drive wheels 2.

In the following description, the direction in which the first wheel 21 and the second wheel 22 are arranged side by side is herein defined as a rightward/leftward direction for the mover 1. In addition, the second wheel 22 is herein defined to be located "on the right" of the first wheel 21, while the first wheel 21 is herein defined to be located "on the left" of the second wheel 22. Furthermore, the direction of gravity is herein defined to be a "downward direction" (down) and the opposite direction thereof is herein defined to be an "upward direction" (up). Furthermore, the direction perpendicular to the rightward/leftward direction and the upward/downward direction is herein defined to be a "forward/backward direction." The crossed arrows shown in FIG. 2 and other drawings indicate the forward, backward, leftward, and rightward directions with respect to the mover 1. Note that these arrows shown in FIG. 2 and other drawings are just shown there as an assistant to description and are insubstantial ones.

Also, even though the plurality of drive wheels 2 are drawn in solid lines in FIG. 2 and other drawings, the plurality of drive wheels 2 are actually hidden behind the body 30. Likewise, even though the trajectory L1 is drawn in solid lines in FIG. 2 and other drawings, part, overlapping with the mover 1, of the trajectory L1 is actually hidden behind the mover 1.

The burden 12 includes a burden body 120 and a plurality of (e.g., four in the example illustrated in FIG. 2) wheels 121. The plurality of wheels 121 are held by the burden body 120. The plurality of wheels 121 are driven wheels.

The burden 12 suitably includes a sensor 122. The sensor 122 is provided separately from the four sensors 4 installed on the body 30. The sensor 122 is held by the burden body 120.

The burden body 120 is held by the body 30. The body 30 includes a coupler 301 to which the burden 12 is coupled. The coupler 301 is provided for a surface, perpendicular to the forward/backward direction, of the body 30. The coupler 301 is a constituent element (such as a hook) which may hook a part of the burden 12 thereon. The burden 12 is provided behind the carrier 11.

The carrier 11 is an unmanned carrier vehicle for carrying the burden 12 and travels autonomously to its destination while holding the burden 12 thereon. In this embodiment, the high-order system 7 communicates with the carrier 11 via a network NT1 and the relay device R1 to indirectly control the movement of the carrier 11. The carrier 11 may carry the burden 12, which is put at a certain place, to somewhere else by towing the burden 12, moving with the burden 12 mounted thereon, or pushing the burden 12.

A parts feeder F1 is fixed to the burden 12. The burden 12 is a cart for carrying the parts feeder F1 to the destination. Note that the burden 12 and the parts feeder F1 may be fixed together to be either separable or inseparable from each other.

The carrier 11 includes not only the body 30 and plurality of drive wheels 2 but also a plurality of (e.g., four in the example illustrated in FIG. 1) sensors 4, the control unit 51, a left drive wheel unit 52, a right drive wheel unit 53, a first communications unit 54, an object detection unit 55, a first storage unit 56, and a power supply 57 as shown in FIG. 1.

(2.2) Sensor

Each of the sensors 4 detects the trajectory L1. As used herein, the "trajectory" defines a traveling route for the mover 1 to take to move to its destination. In this embodiment, the trajectory L1 is set on the traveling surface B1 on which the mover 1 moves. Specifically, the trajectory L1 may be a linear object (such as a magnetic tape or magnetic markers) laid on the traveling surface B1. The mover system 10 controls the mover 1 such that the mover 1 follows the trajectory L1 based on a result of detection of the trajectory L1 obtained by the plurality of sensors 4 installed on the mover 1. This allows the mover 1 to move to its destination while following the trajectory L1. As used herein, the phrase "follow the trajectory" refers to not only a situation where the mover 1 moves on the trajectory L1 but also a situation where the mover 1 moves along the trajectory L1 so as not to overlap with the trajectory L1.

In the following description, when there is any need to distinguish the four sensors 4 from each other, those four sensors 4 will be hereinafter designated by the reference signs 41, 42, 43, and 44, respectively.

Each sensor 4 may be a magnetic sensor, for example. Each sensor 4 may have a bar shape. Each sensor 4 acquires information about relative positions of the sensor 4 with respect to the trajectory L1 (i.e., information about the degree of misalignment of the sensor 4 with respect to the trajectory L1) by detecting a magnetic flux generated from the trajectory L1. As used herein, the "misalignment" may be represented, for example, by the shortest distance between the center of the sensor 4 and the trajectory L1.

Each sensor 4 may include, for example, an array in which a plurality of sensor elements are arranged in line. Each of those sensor elements detects a magnetic flux and the result of detection is processed by the control unit 51, thereby determining the relative position (misalignment) of the sensor 4 with respect to the trajectory L1. Specifically, when the detection range of the sensor 4 overlaps with the trajectory L1, the control unit 51 detects the position of the trajectory L1 within the detection range of the sensor 4. That is to say, the sensor 4 determines whether or not the detection range of the sensor 4 overlaps with the trajectory L1 and also determines exactly what part of the detection range overlaps with the trajectory L1 if the answer is YES. In this embodiment, the detection range of the sensor 4 corresponds to, in a top view, to an area inside of the outer periphery of the sensor 4. In other words, in a top view, the detection range of the sensor 4 substantially agrees with the area inside of the outer periphery of the sensor 4. Note that the sensor 122 provided for the burden 12 also has the same function as the sensors 4.

The longitudinal axis of the sensors 41, 42 extends in the rightward/leftward direction. On the other hand, the longitudinal axis of the sensors 43, 44 extends in the forward/backward direction.

The sensor 41 is provided at a front end of the body 30. The sensor 42 is provided at a rear end of the body 30. The sensor 42 is provided behind the sensor 41. The sensors 43, 44 are arranged between the first wheel 21 and the second wheel 22. The sensor 43 is installed between the center of the body 30 and the first wheel 21. The sensor 44 is installed between the center of the body 30 and the second wheel 22.

(2.3) Control Unit

The control unit 51 includes a computer system including one or more processors and a memory. Thus, the functions of the control unit 51 are performed by making the one or more processors execute a program stored in the memory. The program may be stored in advance in the memory. Alternatively, the program may also be downloaded via a telecommunications line such as the Internet or distributed after having been stored in a non-transitory storage medium such as a memory card.

As shown in FIG. 1, the control unit 51 includes a traveling control unit 511, an area setting unit 512, and a position calculating unit 513. Note that these units just represent the functions to be performed by the control unit 51 and do not necessarily have a substantive configuration.

The traveling control unit 511 controls the movement of the plurality of drive wheels 2. More specifically, the traveling control unit 511 controls the movement of the plurality of drive wheels 2 by controlling the left drive wheel unit 52 and the right drive wheel unit 53.

The area setting unit 512 determines the boundary of an object detection area A1 (see FIG. 10) to be described later.

The position calculating unit 513 determines, based on the result of detection obtained by the plurality of sensors 4, the position of the trajectory L1 within the detection range of the sensors 4.

(2.4) Left Drive Wheel Unit and Right Drive Wheel Unit

The left drive wheel unit 52 is a control unit for controlling the rotation and steering angle of the first wheel 21. The left drive wheel unit 52 includes: a drive motor 521 for turning the first wheel 21; and a steering motor 522 for changing the orientation (i.e., the rolling direction) of the first wheel 21. The left drive wheel unit 52 receives a control command from the traveling control unit 511. In accordance with the control command, the steering motor 522 changes the orientation of the first wheel 21 into an orientation instructed by the control command and the drive motor 521 turns the first wheel 21 with a rotational torque instructed by the control command. In addition, in accordance with the control command from the traveling control unit 511, the left drive wheel unit 52 restricts the rotational velocity of the first wheel 21 to at most an upper limit value instructed by the traveling control unit 511.

As used herein, the "steering angle" refers to an angle formed between the forward/backward direction for the mover 1 and the rolling direction of the drive wheels 2 in a top view of the mover 1. The steering angle of each drive wheel 2 is variable within the range from −180 degrees to 180 degrees.

The right drive wheel unit 53 is a control unit for controlling the rotation and steering angle of the second wheel 22. The right drive wheel unit 53 includes: a drive motor 531 for turning the second wheel 22; and a steering motor 532 for changing the orientation (i.e., the rolling direction) of the second wheel 22. The right drive wheel unit 53 receives a control command from the traveling control unit 511. In accordance with the control command, the steering motor 532 changes the orientation of the second wheel 22 into an orientation instructed by the control command and the drive motor 531 turns the second wheel 22 with a rotational torque instructed by the control command. In addition, in accordance with the control command from the traveling control unit 511, the right drive wheel unit 53 restricts the rotational velocity of the second wheel 22 to at most an upper limit value instructed by the traveling control unit 511.

(2.5) First Communications Unit

The first communications unit 54 is ready to communicate with (a second communications unit 72 of) the high-order system 7. As used herein, "to be ready to communicate" means being able to transmit and receive information either directly or indirectly via a network NT1 or a relay device R1, for example, by an appropriate communications method that is either wired communication or wireless communication. In this embodiment, the first communications unit 54 communicates with the relay device R1 by wireless communication method and communicates with the high-order system 7 via the network NT1.

(2.6) Object Detection Unit

The object detection unit 55 detects the presence or absence of an object in the object detection area A1 (see FIG. 10) which is set around the mover 1. The object detection unit 55 may include sensors such as an image sensor (camera), a sonar sensor, a radar, and a light detection and ranging (LiDAR) sensor, to detect the presence or absence of an object in the object detection area A1 by using these sensors.

In addition, the carrier 11 includes a traveling detection unit 550. In this embodiment, the object detection unit 55 also functions as the traveling detection unit 550. The traveling detection unit 550 detects the current location of the body 30 and its surroundings. The traveling detection unit 550 may determine the current location based on information about the surrounding objects as detected by the LiDAR sensor and electronic map information about the area where the mover 1 is currently traveling, for example. Alternatively, the traveling detection unit 550 may also determine the current location by a local positioning system (LPS) using a radio wave beacon. Still alternatively, the traveling detection unit 550 may also determining the current location by a satellite positioning system such as a global positioning system (GPS).

Furthermore, the traveling detection unit 550 may also detect the operating state of the mover 1, for example. Examples of the operating state of the mover 1 includes the battery level of a power supply 57 of the mover 1, the status indicating whether the mover 1 is traveling or at a stop, the velocity (and a variation in the velocity) of the mover 1, the acceleration applied to the mover 1, and the orientation of the mover 1. The traveling detection unit 550 includes various types of sensors such as a velocity sensor, an acceleration sensor, and a gyrosensor, and detects the operating state of the mover 1 by using these sensors.

The mover 1 may not only move to follow the trajectory L1 but also move off the trajectory L1 by reference to the information about the current location and the operating state, for example.

(2.7) First Storage Unit

The first storage unit 56 includes a semiconductor memory such as a nonvolatile memory. The first storage unit 56 stores, for example, setting information about the object detection area A1 to be set around the mover 1. In this embodiment, the area setting unit 512 changes at least one of the shape or size of the object detection area A1 according to the traveling state of the mover 1. The first storage unit 56 stores multiple items of area data representing a plurality of candidate areas having mutually different ranges. The area data may be, for example, coordinate data representing the ranges of those candidate areas on an XY coordinate plane, of which the origin is defined by the center position of the body 30 of the mover 1 and which is perpendicular to the upward/downward direction. The area data about the plurality of candidate areas may be stored in advance in the first storage unit 56. Alternatively, area data about the plurality of candidate areas received from the high-order system 7 may be stored in the first storage unit 56.

(2.8) Power Supply

The power supply 57 may be a storage battery, for example. The mover 1 is powered by the electric energy stored in the storage battery.

(3) High-Order System

The mover 1 is ready to communicate with the high-order system 7. In this embodiment, the high-order system 7 and the mover 1 are ready to communicate with each other bidirectionally. That is to say, information may be transmitted from the high-order system 7 to the mover 1 and may also be transmitted from the mover 1 to the high-order system 7.

In the facility, a plurality of mover systems 10 may be provided. That is to say, in the facility, a plurality of movers 1 may be present. The high-order system 7 is a system for controlling the plurality of movers 1 comprehensively and may be implemented as a server device, for example. The high-order system 7 controls the plurality of movers 1 indirectly by giving an instruction to each of the plurality of mover systems 10.

The high-order system 7 includes a processing unit 71, the second communications unit 72, and a second storage unit 73.

The processing unit 71 includes a computer system including one or more processors and a memory. Thus, the functions of the processing unit 71 are performed by making the one or more processors execute a program stored in the memory. The program may be stored in advance in the memory. Alternatively, the program may also be downloaded via a telecommunications line such as the Internet or distributed after having been stored in a non-transitory storage medium such as a memory card.

The processing unit 71 is configured to perform overall control on the high-order system 7. In addition, the processing unit 71 also has a carry instruction that the burden 12 should be carried transmitted from the second communications unit 72 to the mover 1 as the target of control.

The second communications unit 72 communicates with (the first communications unit 54 of) the mover 1 via the network NT1 and the relay device R1.

The second storage unit 73 stores for example, electronic map information of a predetermined area in which the mover 1 moves. In addition, the second storage unit 73 also stores area data representing the object detection area A1 (see FIG. 10).

(4) Parts Feeder

In FIG. 2, the parts feeder F1 (feeder) is used to feed parts onto the mounter body 8 installed in a factory. In this embodiment, in accordance with an instruction from the high-order system 7, the carrier 11 carries, along with the parts feeder F1 mounted on the burden 12, the burden 12 that is put at a certain place within the predetermined area. As a result, the parts feeder F1 is moved to the mounter body 8. More specifically, the parts feeder F1 is moved into a recess 81 provided on a side surface of the mounter body 8. When the parts feeder F1 is moved into the recess 81, a second connector of the burden 12 is connected to a first connector provided for the mounter body 8, thus making the mounter body 8 and the burden 12 connected to each other. With the mounter body 8 and the burden 12 thus connected to each other, the parts may be fed from the parts feeder F1 onto the mounter body 8.

(5) First Exemplary Operation

Next, a first exemplary operation of the mover system 10 that carries the burden 12 to its destination (recess 81) will be described with reference to FIGS. 3-9. Note that illustration of the burden 12 is omitted in FIGS. 4-9. Also, the flowchart shown in FIG. 3 shows only an exemplary method for controlling the mover 1 according to the present disclosure. Thus, the order in which the processing steps shown in FIG. 3 are performed may be changed as appropriate, an additional processing step not shown in FIG. 3 may be performed, or some of the processing steps shown in FIG. 3 may be omitted as appropriate.

The trajectory L1 (such as a magnetic tape) is extended to the place where the mounter body 8 is installed. In accordance with an instruction given by the high-order system 7, the carrier 11 holds the burden 12 and moves, along with the burden 12, to the trajectory L1 (in Step ST1 shown in FIG. 3). That is to say, the mover 1 moves to the trajectory L1. The mover 1 moves to the trajectory L1 by reference to information acquired by the traveling detection unit 550 about the current location and the operating state, for example. In this example, the trajectory L1 is supposed to be linear.

In the first exemplary operation, it has been determined in advance which of the plurality of sensors 4 are used as the first, second, and third sensors, respectively. That is to say, the control unit 51 uses a sensor selected from the plurality of sensors 4 as a first sensor, another sensor 4, different from the first sensor, as a second sensor, and a sensor 4, different from the second sensor, as a third sensor. In this example, the control unit 51 uses the sensor 41 as the first sensor and third sensor and uses the sensor 42 as the second sensor.

Figure 4:
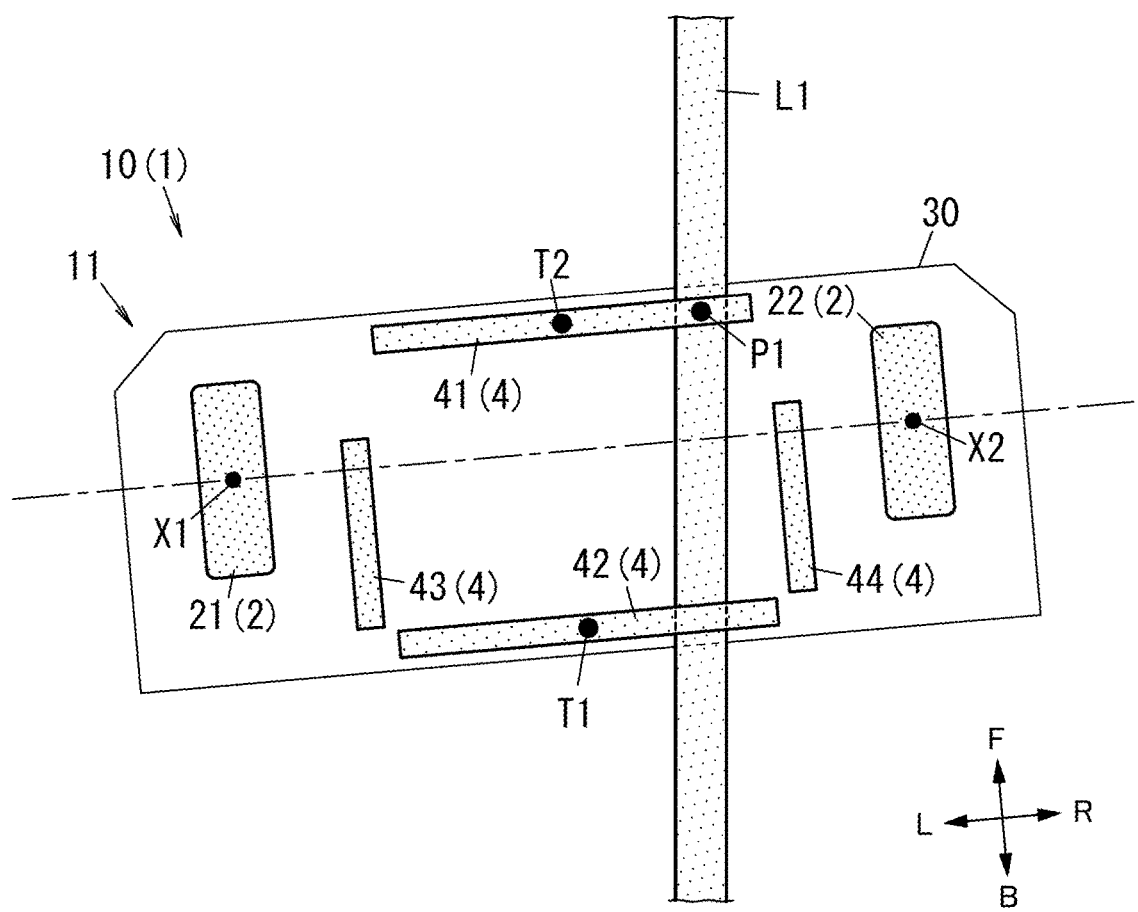
FIG. 4 is a plan view illustrating a state at a starting point of a turn operation by the mover system.

As shown in FIGS. 2 and 4, in the traveling direction (either the forward direction or the backward direction) of the mover 1 when two predetermined drive wheels (i.e., the first wheel 21 and the second wheel 22) out of the plurality of drive wheels 2 have their center axes aligned with each other, the second sensor (sensor 42) and the third sensor (sensor 41) are arranged.

Also as shown in FIG. 2, when viewed from the tip 123 in the traveling direction (e.g., the backward direction in FIG. 2) of the mover 1 in a situation where the two predetermined drive wheels (i.e., the first wheel 21 and the second wheel 22) out of the plurality of drive wheels 2 have their center axes aligned with each other, the first sensor (sensor 41) is located more distant than the second sensor (sensor 42).

When the first sensor detects the trajectory L1 (if the answer is YES in Step ST2) while the mover 1 is traveling in Step ST1, the control unit 51 makes the mover 1 stop traveling. FIG. 4 illustrates a state where the first sensor (sensor 41) has detected the trajectory L1 and the mover 1 has stopped traveling. In FIG. 4, the sensor 41 senses that the trajectory L1 is present at a predetermined position P1 overlapping with the trajectory L1.

Figure 5:
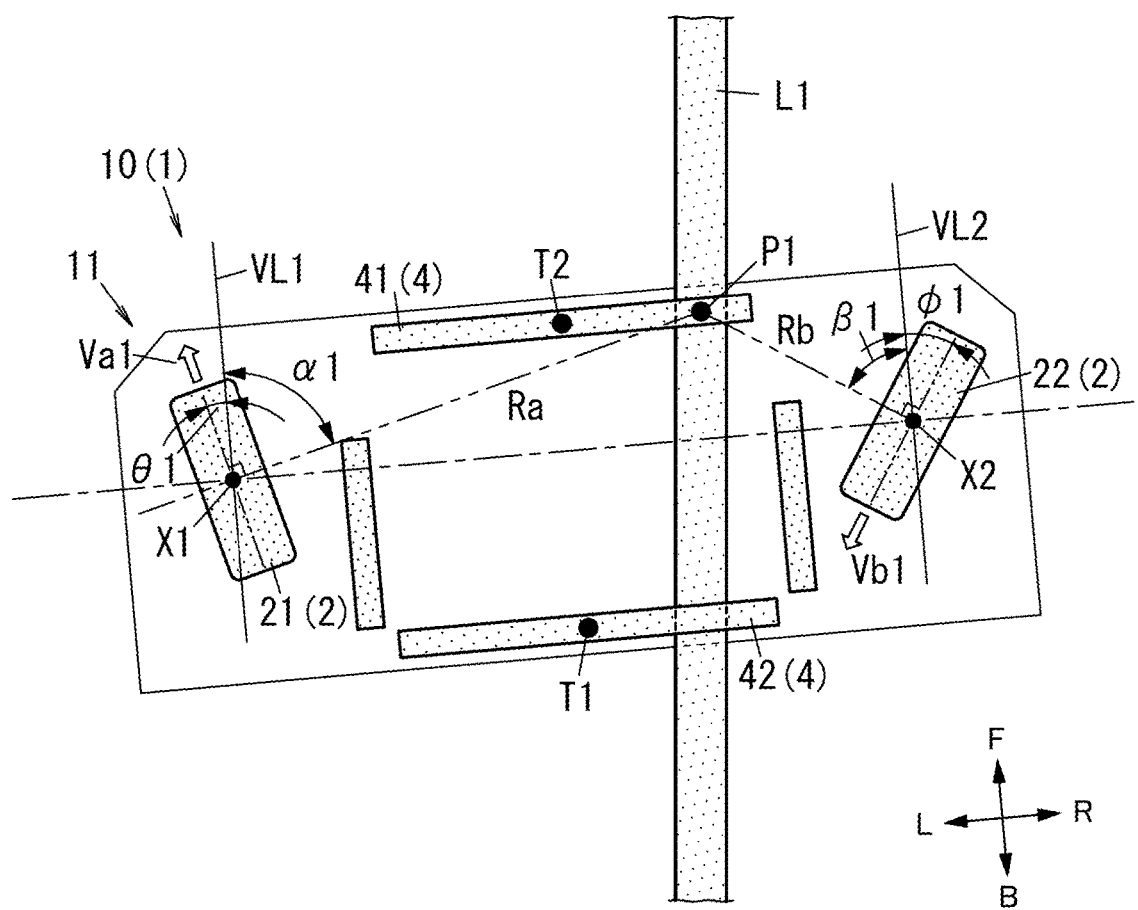
FIG. 5 illustrates a state at another point of the turn operation in progress by the mover system.

Next, the control unit 51 calculates the respective steering angles and traveling velocities of the plurality of drive wheels to make the mover 1 turn in the first turning step (in Step ST3). As shown in FIG. 5, the steering angle θ1 of the first wheel 21 is an angle (which is supposed to be an acute angle) formed between a virtual line VL1 aligned with the forward/backward direction for the mover 1 and the rolling direction of the first wheel 21 in a top view. The steering angle φ1 of the second wheel 22 is an angle (which is supposed to be an acute angle) formed between a virtual line VL2 aligned with the forward/backward direction for the mover 1 and the rolling direction of the second wheel 22 in a top view. Also, in the following description, the complementary angle α1 of the steering angle θ1 and the complementary angle β1 of the steering angle φ1 will be used.

The steering motor 522 (see FIG. 1) changes the rolling direction of the first wheel 21 by turning the first wheel 21 around a rotational axis X1. The steering motor 532 (see FIG. 1) changes the rolling direction of the second wheel 22 by turning the second wheel 22 around a rotational axis X2.

In the first turning step, the mover 1 turns around the position P1, where the sensor 41 overlaps with the trajectory L1, such that the relation of the position P1 relative to the trajectory L1 does not change. To perform such a first turning step, the steering angle θ1 is determined such that a line segment that connects the position P1 to the rotational axis X1 is perpendicular, in a top view, to an axis aligned with the rolling direction of the first wheel 21. In addition, to perform such a first turning step, the steering angle φ1 is determined such that a line segment that connects the position P1 to the rotational axis X2 is perpendicular, in a top view, to an axis aligned with the rolling direction of the second wheel 22.

Meanwhile, the traveling velocities of the respective drive wheels 2 are determined in the following manner. Specifically, the control unit 51 determines the traveling velocities of the respective drive wheels 2 to make the angular velocities of the first wheel 21 and the second wheel 22 equal to each other. As a result, the respective movements of the first wheel 21 and the second wheel 22 may be matched to each other. More specifically, this allows the first wheel 21 and the second wheel 22 to roll without idling.

The condition for making the respective angular velocities of the first wheel 21 and the second wheel 22 equal to each other is expressed by the following Equation (1):

$$Va/Ra = Vb/Rb \tag{1}$$

where Va is the velocity (traveling velocity) of the first wheel 21 in the rolling direction, Vb is the velocity (traveling velocity) of the second wheel 22 in the rolling direction, Ra is the distance between the position P1 and the rotational axis X1, and Rb is the distance between the position P1 and the rotational axis X2.

On the other hand, the following Equation (2) is satisfied as shown in FIG. 5:

$$Ra \times \cos\alpha = Rb \times \cos\beta \tag{2}$$

where α=α1 and β=β1.

As can be seen from these Equations (1) and (2), if the traveling velocities Va and Vb are determined to satisfy the following Equation (3), the angular velocity of the first wheel 21 is equal to the angular velocity of the second wheel 22:

$$Va \times \cos\alpha = Vb \times \cos\beta \tag{3}$$

In the following description, the traveling velocities Va and Vb obtained in Step ST3 will be hereinafter designated by Va1 and Vb1, respectively.

Note that the signs of the traveling velocities Va1, Vb1 are determined such that the respective directions of angular movements around the position P1 agree with each other. That is to say, the signs of the traveling velocities Va1, Vb1 are determined such that the traveling velocities Va1, Vb1 each contribute to a clockwise or counterclockwise rotation of the mover 1 in a top view.

The control unit 51 starts, after having determined the steering angles θ1, φ1 and the traveling velocities Va1, Vb1, performing the first turning step (in Step ST4). First, the control unit 51 outputs a control command to the steering motors 522, 532 to change the rolling directions of the first wheel 21 and the second wheel 22 such that the steering angles θ1, φ1 are formed (see FIG. 5). Next, the control unit 51 makes the first wheel 21 travel at the traveling velocity Va1 and also makes the second wheel 22 travel at the traveling velocity Vb1 until the sensor 42 (second sensor) senses a state where the trajectory L1 is present at a first target position T1 within the second detection range of the sensor 42. In this example, the first target position T1 has been set in advance and stored in the first storage unit 56. In this embodiment, the first target position T1 is a center position of the sensor 42. The first target position T1 is not an absolute location set on the traveling surface B1, but a position set on the axis of coordinates that rotates and moves along with the mover 1.

Figure 6:
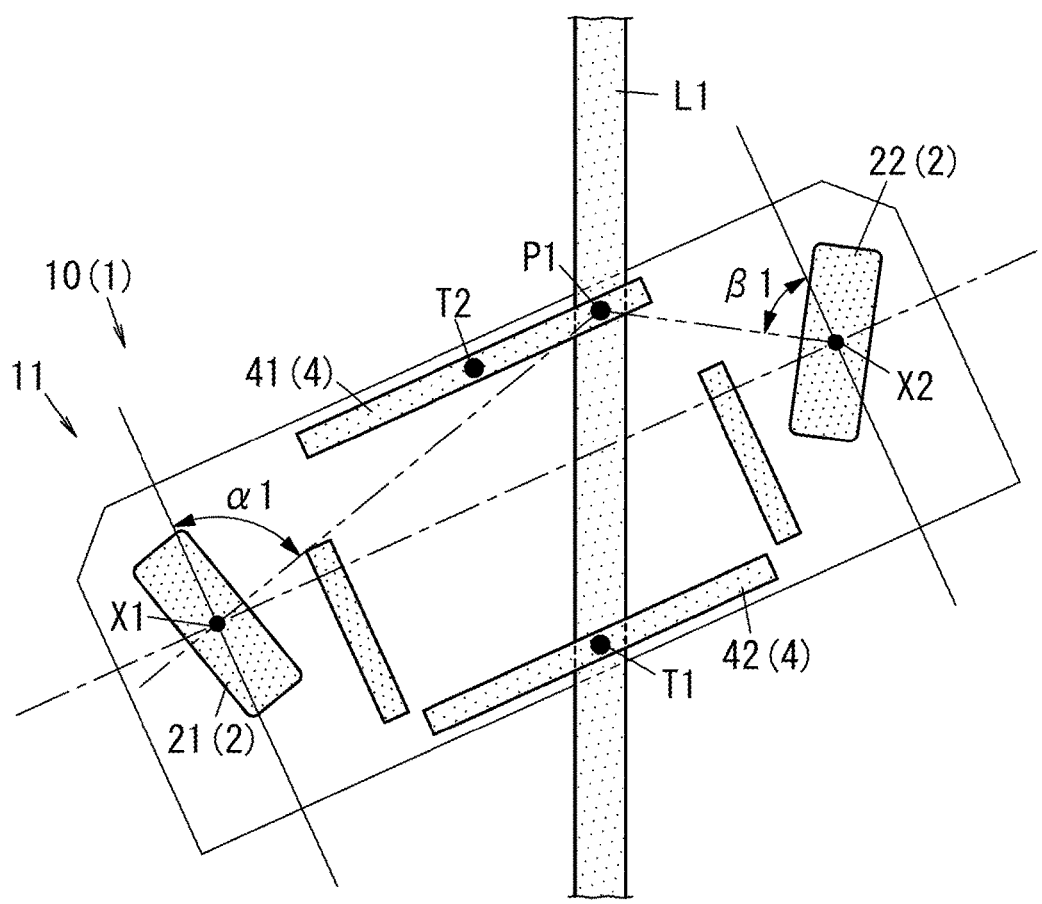
FIG. 6 illustrates a state at still another point of the turn operation in progress by the mover system.

When the sensor 42 senses the state where the trajectory L1 is present at the first target position T1 (if the answer is YES in Step ST5), the control unit 51 makes the mover 1 stop traveling. FIG. 6 illustrates a state where the sensor 42 senses that the trajectory L1 is present at the first target position T1 and the mover 1 has stopped traveling.

Next, the control unit 51 calculates the respective steering angles and traveling velocities of the plurality of drive wheels 2 to make the mover 1 turn in the second turning step (in Step ST6). That is to say, the control unit 51 determines the steering angles and the traveling velocities once again. In the following description, the steering angles and the traveling velocities determined in Step ST6 will be designated by θ2, φ2, Va2, Vb2, respectively.

Figure 7:
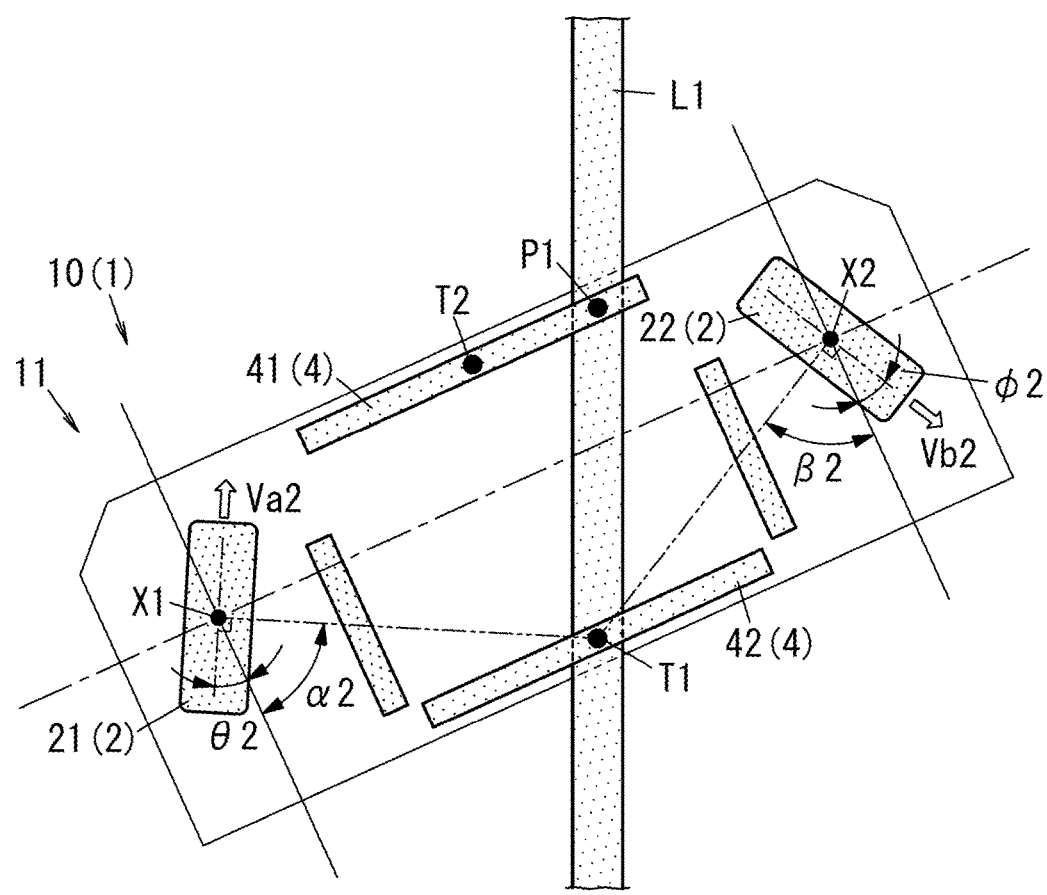
FIG. 7 illustrates a state at yet another point of the turn operation in progress by the mover system.

In the second turning step, the mover 1 turns around the first target position T1 such that the relation of the first target position T1 relative to the trajectory L1 does not change. To perform such a second turning step, a new steering angle θ2 (and complementary angle α2) is determined such that a line segment that connects the first target position T1 to the rotational axis X1 is perpendicular, in a top view, to the axis aligned with the rolling direction of the first wheel 21 as shown in FIG. 7. In addition, to perform such a second turning step, a new steering angle φ2 (and complementary angle β2) is determined such that a line segment that connects the first target position T1 to the rotational axis X2 is perpendicular, in a top view, to the axis aligned with the rolling direction of the second wheel 22 as shown in FIG. 7.

On the other hand, the traveling velocities Va2, Vb2 of the respective drive wheels 2 are determined by Equation (3). In this case, Va=Va2, Vb=Vb2, α=α2, and β=β2 are satisfied. Note that the signs of the traveling velocities Va2, Vb2 are determined such that the respective directions of angular movements around the first target position T1 agree with each other.

The control unit 51 starts, after having determined the steering angles θ2, φ2 and the traveling velocities Va2, Vb2, performing the second turning step (in Step ST7). First, the control unit 51 outputs a control command to the steering motors 522, 532 to change the rolling directions of the first wheel 21 and the second wheel 22 such that the steering angles θ2, φ2 are formed (see FIG. 7). Next, the control unit 51 makes the first wheel 21 travel at the traveling velocity Va2 and also makes the second wheel 22 travel at the traveling velocity Vb2 until the sensor 41 (third sensor) senses a state where the trajectory L1 is present at a second target position T2 within the third detection range of the sensor 41. In this example, the second target position T2 has been set in advance and stored in the first storage unit 56. In this embodiment, the second target position T2 is a center position of the sensor 41. The second target position T2 is not an absolute location set on the traveling surface B1, but a position set on the axis of coordinates that rotates and moves along with the mover 1.

Figure 8:
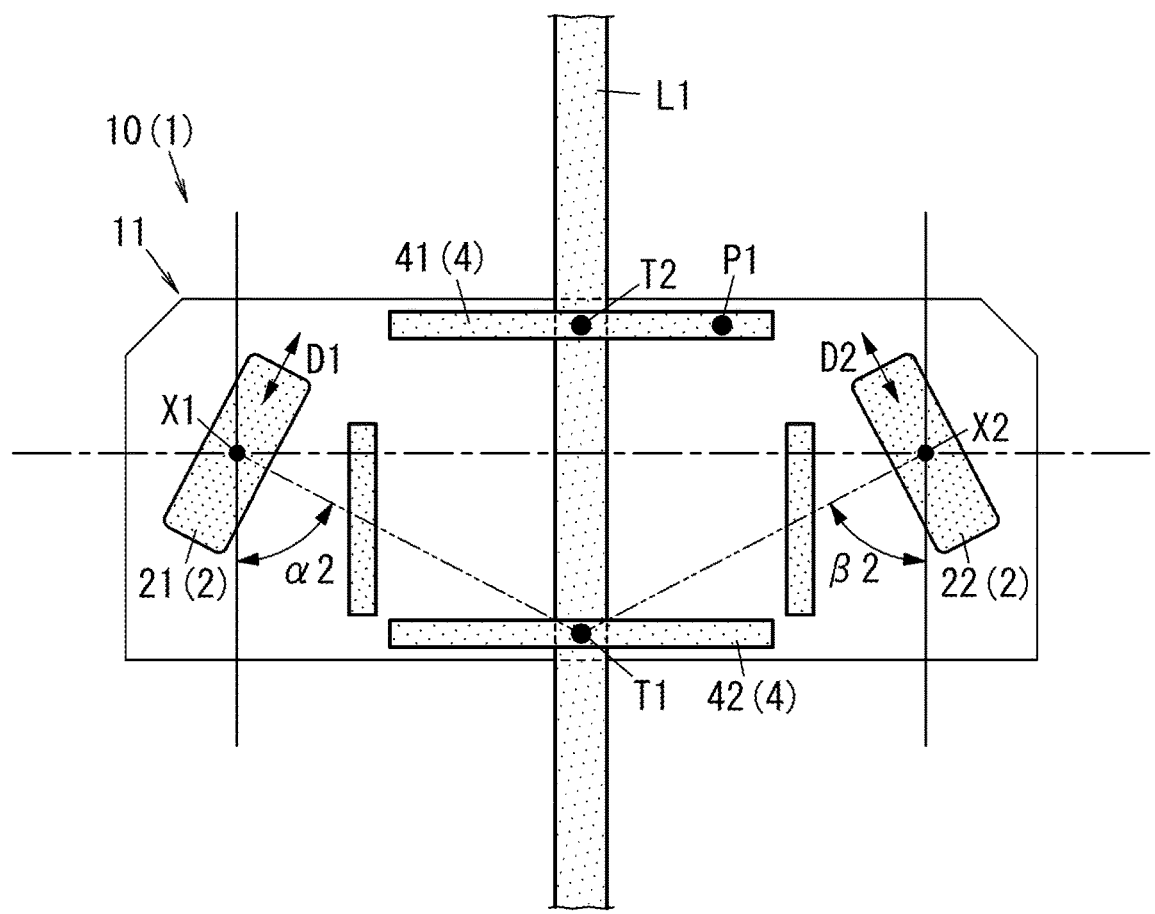
FIG. 8 illustrates a state at yet another point of the turn operation in progress by the mover system.

When the sensor 41 senses the state where the trajectory L1 is present at the second target position T2 (if the answer is YES in Step ST8), the control unit 51 makes the mover 1 stop traveling. FIG. 8 illustrates a state where the sensor 41 senses that the trajectory L1 is present at the second target position T2 and the mover 1 has stopped traveling.

When the second turning step ends, the first target position T1 and the second target position T2 are both located on the trajectory L1. In this embodiment, the first target position T1 and the second target position T2 are arranged in the forward/backward direction. Thus, when the second turning step ends, the mover 1 has such an orientation that makes the forward/backward direction for the mover 1 aligned with the longitudinal axis of the linear trajectory L1.

After the second turning step, the control unit 51 performs a turnaround step (in Step ST9). The turnaround step is the step of making each of the plurality of drive wheels 2 change its rolling direction on the spot such that the rolling direction of each of the plurality of drive wheels 2 turns into a desired direction. The desired direction may be different from one drive wheel 2 to another. The control unit 51 outputs a control command to the steering motor 522 (see FIG. 1) to make the first wheel 21 turn around the rotational axis X1 and thereby change the rolling direction D1 of the first wheel 21. Likewise, the control unit 51 also outputs a control command to the steering motor 532 (see FIG. 1) to make the second wheel 22 turn around the rotational axis X2 and thereby change the rolling direction D2 of the second wheel 22.

Figure 9:
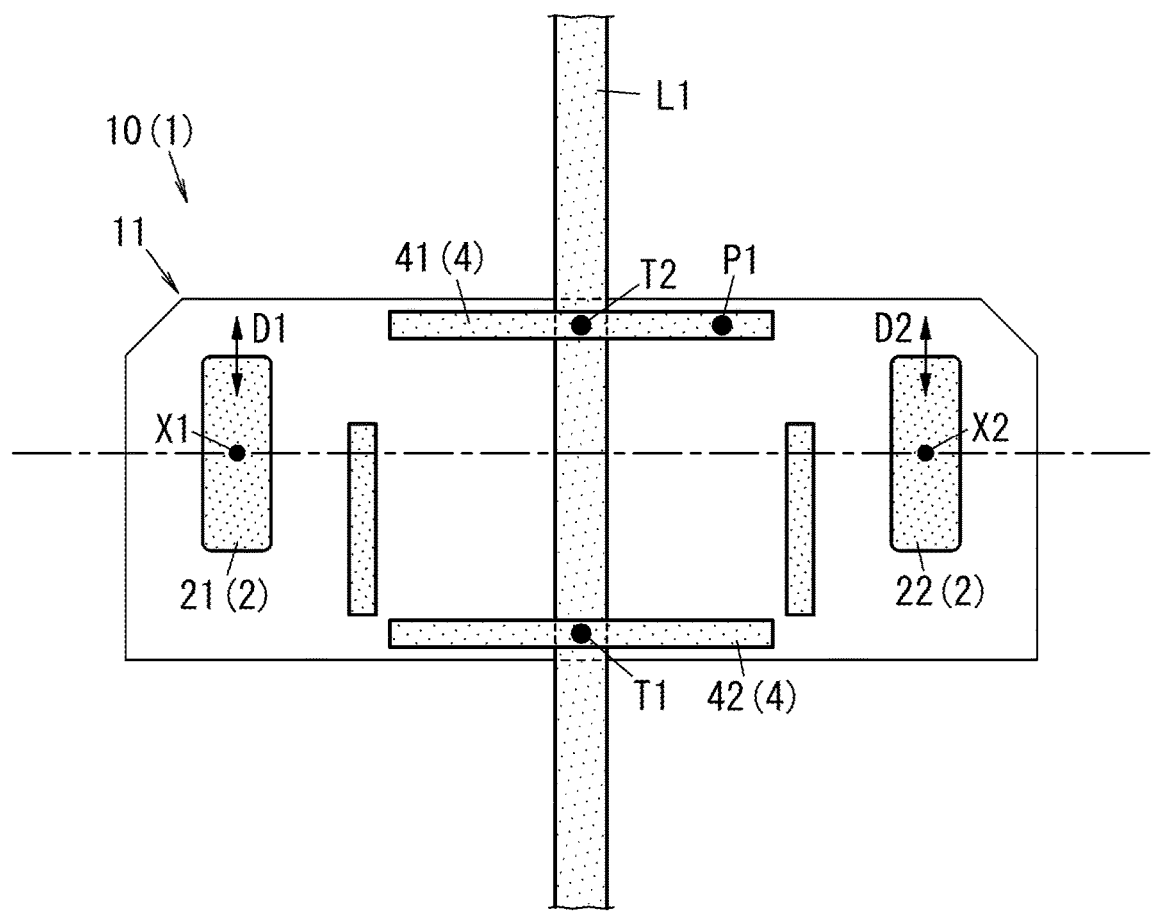
FIG. 9 is a plan view illustrating a state at an end point of the turn operation by the mover system.

FIG. 9 illustrates the mover 1 that has been subjected to the turnaround step. In this embodiment, the desired direction in the turnaround step is a direction in which the rolling direction of each of the plurality of drive wheels 2 is aligned with the trajectory L1. More specifically, the desired direction is a direction in which the rolling direction of each of the plurality of drive wheels 2 is parallel to the trajectory L1. As used herein, if something is "parallel to" another thing, these two things may naturally be exactly parallel to each other but may also be substantially parallel to each other. For example, even if the two things are not exactly parallel to each other but form an angle on the order of a few degrees between them, the two things are herein regarded as being "parallel to each other."

In this embodiment, the rolling directions of the plurality of drive wheels 2 turn oblique with respect to the forward/backward direction as a result of the turning operation (see FIG. 8). From such a state, the rolling directions of the plurality of drive wheels 2 change into the direction aligned with the forward/backward direction through the turnaround step (see FIG. 9). Thus, the angular change of the plurality of drive wheels 2 as a result of the turnaround (i.e., the change in the rotational angle of the rotation around the rotational axes X1, X2 aligned with the upward/downward direction) is smaller than in a situation where the rolling directions of the plurality of drive wheels 2 change from a direction parallel to the rightward/leftward direction into a direction aligned with the forward/backward direction as a result of the turnaround. The small angular change may reduce the chances of the plurality of drive wheels 2 slipping as a result of the turnaround and may also reduce the degree of slipping even if the drive wheels 2 have slipped. This may reduce the chances of the mover 1 being misaligned with respect to the trajectory L1 and may also reduce the degree of misalignment even if the mover 1 has been misaligned.

After the turnaround step, the mover 1 moves along the trajectory L1 (in Step ST10). In this embodiment, the mover 1 retreats along the trajectory L1. If the trajectory L1 includes a curve, then the mover 1 detects the curve by using the plurality of sensors 4. Then, the control unit 51 determines the steering angles and traveling velocities of the plurality of drive wheels 2 based on the results of detection obtained by the plurality of sensors 4 and makes the mover 1 travel along the curve.

When the mover 1 arrives at its destination (in Step ST11), the control unit 51 makes the mover 1 stop traveling. The destination is a location where the parts feeder F1 is housed inside the recess 81 of the mounter body 8 (see FIG. 2). As a result of these processing steps, the parts feeder F1 is ready to feed parts to the mounter body 8.

Optionally, the control unit 51 may determine the first target position T1 and the second target position T2 such that the first target position T1 and the second target position T2 are arranged side by side in a direction intersecting with the forward/backward direction in a top view. Then, the control unit 51 may make the mover 1 turn such that the forward/backward direction for the mover 1 intersects with the trajectory L1 in a top view.

The mover 1 turns around a point on the first sensor (sensor 41) in the first turning step and turns around a point on the second sensor (sensor 42) in the second turning step.

When viewed from the tip 123 of the mover 1 (see FIG. 2), the first sensor is located more distant from the tip 123 than the second sensor is. Since the first sensor located more distant from the tip 123 becomes the center of turning earlier than the second sensor, the alignment accuracy of the mover 1 (in particular, the tip 123 thereof) with respect to the trajectory L1 may be further improved.

(6) Second Exemplary Operation

Next, a second exemplary operation of the mover system 10 that makes the burden 12 move to its destination will be described with reference to FIGS. 10 and 11. The second exemplary operation is different from the first exemplary operation in that the control unit 51 controls the traveling state of the mover 1 based on a result of detection obtained by the object detection unit 55 (see FIG. 1).

The mover 1 makes the object detection unit 55 detect the presence or absence of any object in the object detection area A1 which is set around the mover 1. When the object detection unit 55 detects the presence of any object in the object detection area A1, the traveling control unit 511 (see FIG. 1) controls the mover 1 to avoid contact between the object present in the object detection area A1 and the mover 1. For example, when the object detection unit 55 detects the presence of an object in the object detection area A1, the traveling control unit 511 makes the mover 1 either slow down to a low velocity or stop traveling. Alternatively, when the object detection unit 55 detects the presence of any object in the object detection area A1 while the mover 1 is turning, the traveling control unit 511 changes the turning direction of the mover 1 to avoid contact with the object. Still alternatively, if the object detection unit 55 detects the presence of any object in the object detection area A1 while the mover 1 is traveling straight, the traveling control unit 511 makes the mover 1 turn to avoid contact with the object.

Each position within the object detection area A1 is a position on the axis of coordinates set on the mover 1. Thus, as the mover 1 moves or rotates, the object detection area A1 also moves or rotates accordingly.

The second storage unit 73 of the high-order system 7 (see FIG. 1) stores area data representing the object detection area A1. The processing unit 71 determines the object detection area A1 based on the area data acquired from the second storage unit 73 and makes the second communications unit 72 transmit a control instruction specifying the object detection area A1. In accordance with the control instruction from the high-order system 7, the area setting unit 512 (see FIG. 1) sets (determines) at least one of the size or shape of the object detection area A1.

The object detection area A1 includes: a carrier area A10 including a first buffer area surrounding the carrier 11 of the mover 1; and a burden area A20 including a second buffer area surrounding the burden 12. The shape of the object detection area A1 is defined by the shape of the mover 1 in a top view. In addition, the object detection area A1 may include an area that overlaps with the mover 1 in a top view (an area either over or under the mover 1). That is to say, the carrier area A10 may include an area that overlaps with the carrier 11 in a top view. The burden area A20 may include an area that overlaps with the burden 12 in a top view.

When the mover 1 is at a stop and while the mover 1 is traveling straight, the shape of the object detection area A1 is a first shape. The first shape is the shape shown in FIG. 10. When the shape of the object detection area A1 is the first shape, a distance L11 from a left end of the mover 1 to a left end of the object detection area A1 is equal to a distance L12 from a right end of the mover 1 to a right end of the object detection area A1. In this example, the distances L11, L12 are each defined by the distance from the carrier 11 to the boundary of the object detection area A1. In FIG. 10, a distance L13 from a left end of the burden 12 to the left end of the object detection area A1 and a distance L14 from a right end of the burden 12 to the right end of the object detection area A1 are also shown.

The mover 1 turns in the first turning step and the second turning step. FIG. 10 illustrates a state where the mover 1 is on the verge of turning around the first target position T1 in the second turning step. FIG. 11 illustrates a state where the mover 1 is turning in the second turning step. In FIGS. 10 and 11, a distance from the front end 302 of mover 1 to the first target position T1 is shorter than a distance from the rear end (tip 123) of the mover 1 to the first target position T1.

The area setting unit 512 expands, when the mover 1 is turning, the object detection area A1 in the direction to which the mover 1 is turning. That is to say, the area setting unit 512 increases (extends) the length of the object detection area A1 in the direction to which the mover 1 is turning, compared to its length at the previous point in time. Even if the mover 1 is turning in any situation other than the first turning step and the second turning step, the area setting unit 512 may also expand the object detection area A1 in the direction to which the mover 1 is turning.

For example, when the mover 1 is turning to the right, the shape of the object detection area A1 is a second shape. The second shape is the shape shown in FIG. 11. When the shape of the object detection area A1 is the second shape, a distance L22 from a right end of the mover 1 (carrier 11) to a right end of the object detection area A1 is equal to the distance L12 of the first shape. On the other hand, when the shape of the object detection area A1 is the second shape, a distance L21 from a left end of the mover 1 (carrier 11) to a left end of the object detection area A1 is longer than the distance L11 of the first shape. That is to say, the area setting unit 512 expands the object detection area A1 in the direction to which the mover 1 is going to travel.

On the other hand, when the mover 1 is turning to the left, for example, the shape of the object detection area A1 is a third shape. When the shape of the object detection area A1 is the third shape, a distance from a left end of the mover 1 (carrier 11) to a left end of the object detection area A1 is equal to the distance L11 of the first shape. On the other hand, when the shape of the object detection area A1 is the third shape, a distance from a right end of the mover 1 (carrier 11) to a right end of the object detection area A1 is longer than the distance L12 of the first shape. That is to say, the area setting unit 512 expands the object detection area A1 in the direction to which the mover 1 is going to travel.

As described for the second exemplary operation, the control unit 51 performs a setting step and a control step. The setting step includes setting, around the mover 1, an object detection area A1 where an object is to be detected. The control step includes controlling the mover 1 based on a result of detection of the object in the object detection area A1. The setting step includes expanding, when the mover 1 is turning, the object detection area A1 in the direction to which the mover 1 is turning. This allows the object detection unit 55 to more easily detect an object that could collide against the mover 1 while the mover 1 is turning.

(First Variation)

Next, a mover system 10 according to a first variation will be described. In the following description, any constituent element of this first variation, having the same function as a counterpart of the embodiment described above, will be designated by the same reference numeral as that counterpart's, and description thereof will be omitted herein.

As in the embodiment described above, the control unit 51 also performs the turnaround step. The turnaround step includes making each of the plurality of drive wheels 2 change its rolling direction on the spot such that the rolling direction of each of the plurality of drive wheels 2 turns into a desired direction.

In the embodiment described above, the desired direction in the turnaround step is a direction in which the rolling direction of each of the plurality of drive wheels 2 is aligned with the trajectory L1 (see FIG. 9). In this first variation, on the other hand, the desired direction in the turnaround step is a direction in which the plurality of drive wheels 2 are either towed in or towed out.

Figure 12:
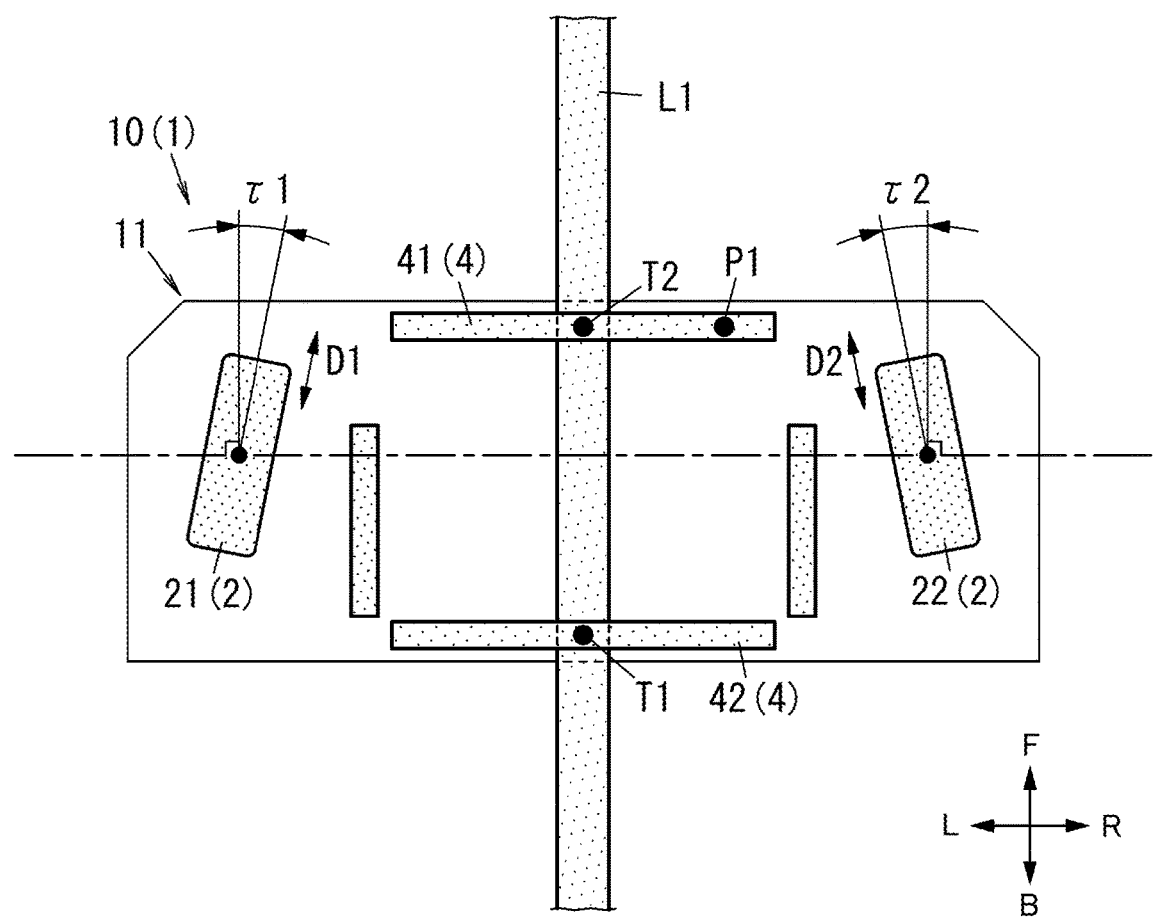
FIG. 12 is a plan view illustrating an exemplary operation of a mover system according to a first variation.

FIG. 12 illustrates a state where the plurality of drive wheels 2 are towed in. A tow angle τ1 of the first wheel 21 is an angle formed between the rolling direction D1 of the first wheel 21 and the forward/backward direction for the mover 1. A tow angle τ2 of the second wheel 22 is an angle formed between the rolling direction D2 of the second wheel 22 and the forward/backward direction for the mover 1. When the plurality of drive wheels 2 are towed in, the tow angles τ1, τ2 may be equal to each other, for example, and both 10 degrees. When the plurality of drive wheels 2 are towed out, the tow angles τ1, τ2 may be equal to each other, for example, and both −10 degrees.

This first variation contributes to increasing the traveling stability of the mover 1 compared to a situation where the tow angles τ1, τ2 are equal to zero degrees.

(Second Variation)

Next, a mover system 10 according to a second variation will be described with reference to FIG. 13. In the following description, any constituent element of this second variation, having the same function as a counterpart of the embodiment described above, will be designated by the same reference numeral as that counterpart's, and description thereof will be omitted herein.

In this second variation, it has not been determined in advance, but is determined before or while the first and second turning steps are performed, which of the plurality of sensors 4 are used as the first, second, and third sensors, respectively. In addition, unlike the embodiment described above, a single sensor 4 does not have to be used as both the first sensor and the third sensor. In this second variation, the first sensor may be a sensor 4 provided separately from the third sensor.

Figure 13:
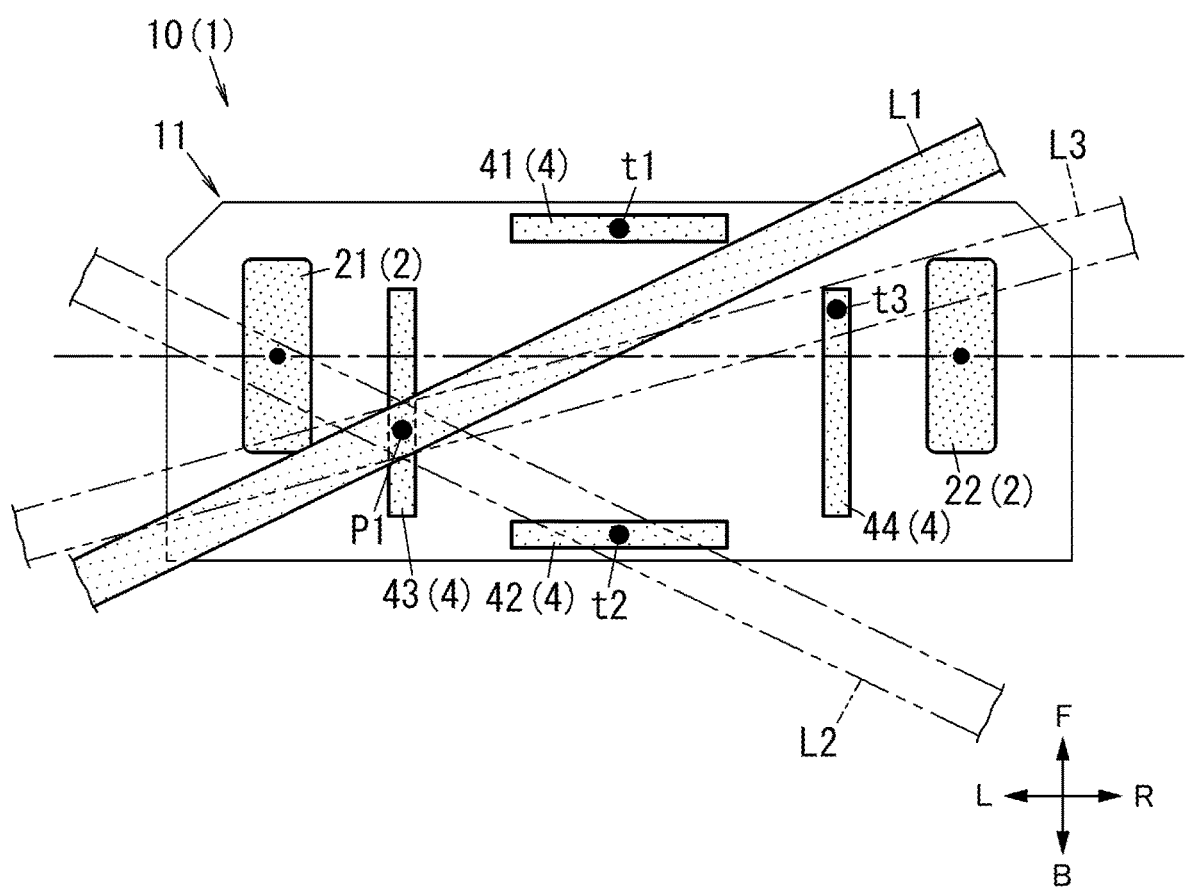
FIG. 13 is a plan view illustrating an exemplary operation of a mover system according to a second variation.

In FIG. 13, the sensor 43 (first sensor) senses that the trajectory L1 is present at a predetermined position P1 that overlaps with the trajectory L1. In this second variation, an example in which the first turning step is performed from this state will be described.

For example, if the mover 1 needs to be turned such that the forward/backward direction for the mover 1 is aligned with the longitudinal axis of the linear trajectory L1 as in the embodiment described above, then the following steps may be taken. Specifically, first, the control unit 51 sets a first target position T1 on either the sensor 41 or the sensor 42. In this second variation, the control unit 51 defines a point t2 on the sensor 42 (second sensor) to be the first target position T1. Then, in the first turning step, the control unit 51 makes the mover 1 turn around the position P1 until the sensor 42 senses a state where the trajectory L1 is present at the first target position T1 (point t2). Making the mover 1 turn in this manner changes the relative position of the mover 1 with respect to the trajectory L1. That is to say, the position of the trajectory L1 comes to be indicated by the phantom line L2 with respect to the mover 1.

Thereafter, the control unit 51 defines a point t1 on the sensor 41 (third sensor) to be the second target position T2. Then, in the second turning step, the control unit 51 makes the mover 1 turn around the first target position T1 (point t2) until the sensor 41 senses a state where the trajectory L1 is present at the second target position T2. This allows the mover 1 to turn such that the forward/backward direction for the mover 1 is aligned with the longitudinal axis of the linear trajectory L1 as shown in FIG. 8.

In another example, if the mover 1 needs to be turned such that the forward/backward direction for the mover 1 intersects (e.g., at right angles) with the trajectory L1 in a top view, then the following steps may be taken. Specifically, first, the control unit 51 defines a point t3 on the sensor 44 (second sensor) to be the first target position T1. Then, in the first turning step, the control unit 51 makes the mover 1 turn around the position P1 until the sensor 44 senses a state where the trajectory L1 is present at the first target position T1 (point t3). Making the mover 1 turn in this manner changes the relative position of the mover 1 with respect to the trajectory L1. That is to say, the position of the trajectory L1 comes to be indicated by the phantom line L3 with respect to the mover 1.

Thereafter, the control unit 51 defines a point on the sensor 43 (third sensor) to be the second target position T2. Then, in the second turning step, the control unit 51 makes the mover 1 turn around the first target position T1 (point t3) until the sensor 41 senses a state where the trajectory L1 is present at the second target position T2. This allows the mover 1 to turn such that the forward/backward direction for the mover 1 intersects (e.g., at right angles) with the trajectory L1 in a top view.

(Third Variation)

Figure 14:
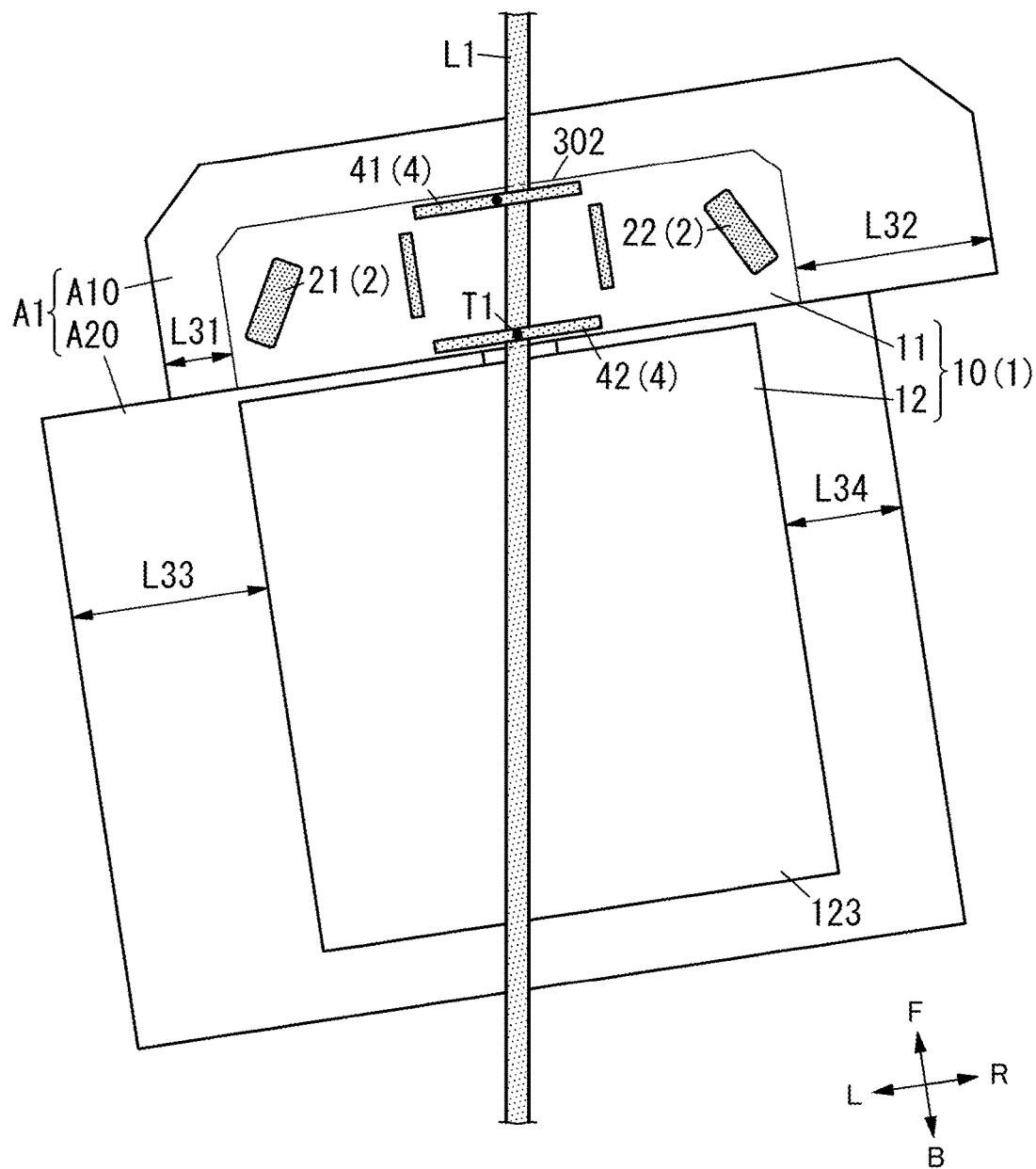
FIG. 14 is a plan view illustrating an exemplary operation of a mover system according to a third variation.

Next, a mover system 10 according to a third variation will be described with reference to FIG. 14. In the following description, any constituent element of this third variation, having the same function as a counterpart of the embodiment described above, will be designated by the same reference numeral as that counterpart's, and description thereof will be omitted herein.

In this third variation, when the mover 1 turns, the object detection area A1 is expanded in a different way from in the embodiment described above. The object detection area A1 includes: a carrier area A10 including a first buffer area surrounding the carrier 11; and a burden area A20 including a second buffer area surrounding the burden 12. When the mover 1 turns, the area setting unit 512 of the control unit 51 expands the carrier area A10 in the direction to which the carrier 11 is turning (or traveling). In addition, when the mover 1 turns, the area setting unit 512 expands the burden area A20 in the direction to which the burden 12 is turning (or traveling).

Figure 10:
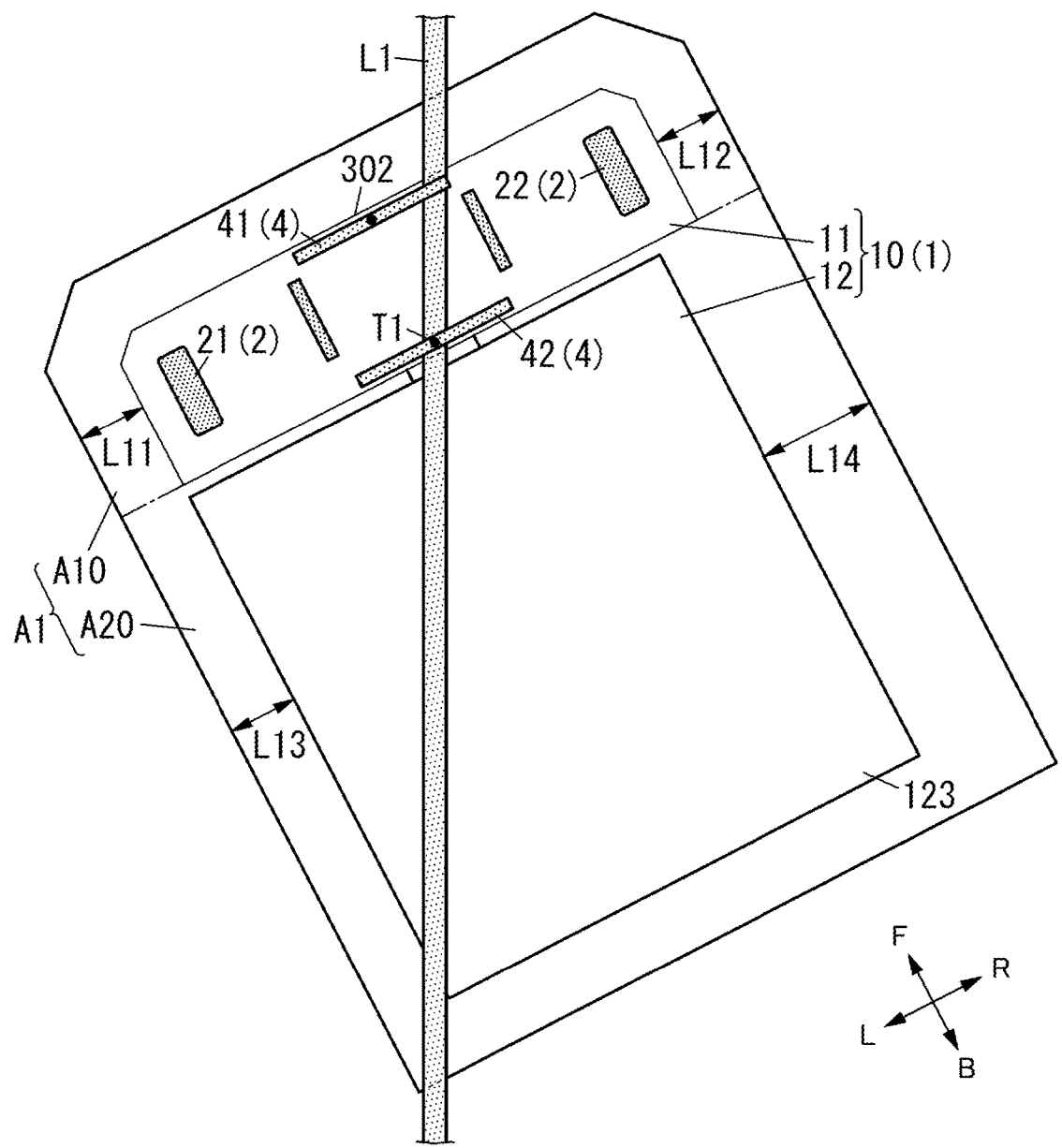
FIG. 10 is a plan view illustrating an exemplary operation of the mover system.

When the mover 1 is at a stop and while the mover 1 is traveling straight, the shape of the object detection area A1 is the shape shown in FIG. 10. FIG. 10 illustrates a state where the mover 1 is on the verge of turning around the first target position T1 in the second turning step. FIG. 14 illustrates a state where the mover 1 is turning to the right in the second turning step. If the mover 1 turns to the right around the first target position T1, the carrier 11 travels to the right and the burden 12 travels to the left.

For example, when the mover 1 is turning to the right, the shape of the object detection area A1 set by the area setting unit 512 is a fourth shape. The fourth shape is the shape shown in FIG. 14. When the shape of the object detection area A1 is the fourth shape, a distance L31 from a left end of the carrier 11 to a left end of the carrier area A10 is equal to the distance L11 of the first shape. On the other hand, a distance L32 from a right end of the carrier 11 to a right end of the carrier area A10 is longer than the distance L12 of the first shape.

Also, when the shape of the object detection area A1 is the fourth shape, a distance L33 from a left end of the burden 12 to a left end of the burden area A20 is longer than the distance L13 of the first shape. On the other hand, a distance L34 from a right end of the burden 12 to a right end of the burden area A20 is equal to the distance L14 of the first shape.

Meanwhile, when the mover 1 is turning to the left, for example, the area setting unit 512 may expand the carrier area A10 and burden area A20 in opposite directions from the directions when the mover 1 is turning to the right.

In this third variation, the area setting unit 512 expands the carrier area A10 in the direction to which the carrier 11 is traveling and also expands the burden area A20 in the direction to which the burden 12 is traveling. This facilitates detecting an object that could collide against the mover 1, compared to the embodiment described above.

Other Variations of the Embodiment

Next, other variations of the embodiment will be enumerated one after another. The variations to be described below may be adopted in combination as appropriate. Also, the variations to be described below may be combined as appropriate with the respective variations described above.

The parts feeder F1 may be regarded as a part of the burden 12.

The carrier 11 does not have to be arranged beside the burden 12 in the forward/backward direction. Alternatively, the carrier 11 may also be arranged in the upward/downward direction or rightward/leftward direction with respect to the burden 12.

The number of the drive wheels 2 does not have to be two but may also be three or more. Optionally, at least one of the plurality of drive wheels 2 may be provided for the burden 12. The control unit 51 may perform the first turning step and the second turning step by controlling the drive wheel of the burden 12.

The sensor 122 of the burden 12 may be used as the first, second, or third sensor. Also, if the burden 12 includes a plurality of sensors 122, the carrier 11 may include no sensors 4.

If only the sensor 4 of the carrier 11 is used as the first, second, or third sensor, then the sensor 4 is distant from the tip 123 (rear end) of the burden 12, and therefore, the alignment accuracy of the tip 123 becomes relatively low. On the other hand, using the sensor 122 of the burden 12 as the first, second, or third sensor may improve the alignment accuracy of the burden 12 (in particular, the tip 123 thereof).

The method by which the sensor 4 detects the trajectory L1 does not have to be a method that uses magnetism. For example, an optical sensor provided as the sensor 4 may detect the trajectory L1 by projecting light onto a reflective tape provided as the trajectory L1 and detecting the reflected light.

The detection ranges (first to third detection ranges) of the sensors 4 do not have to overlap with the sensors 4 in a top view.

In the embodiment described above, the number of the sensors provided for the mover 1 is supposed to be five (namely, the four sensors 4 and the sensor 122). However, the number of the sensors provided does not have to be five but may be two or more. For example, only two sensors 41 and 42 may be provided.

The mover system 10 may turn by performing, after having performed the second turning step, another turning step similar to the second turning step.

The object detection area A1 does not have to include either the carrier area A10 having a first buffer area surrounding the carrier 11 or the burden area A20 having a second buffer area surrounding the burden 12.

Figure 11:
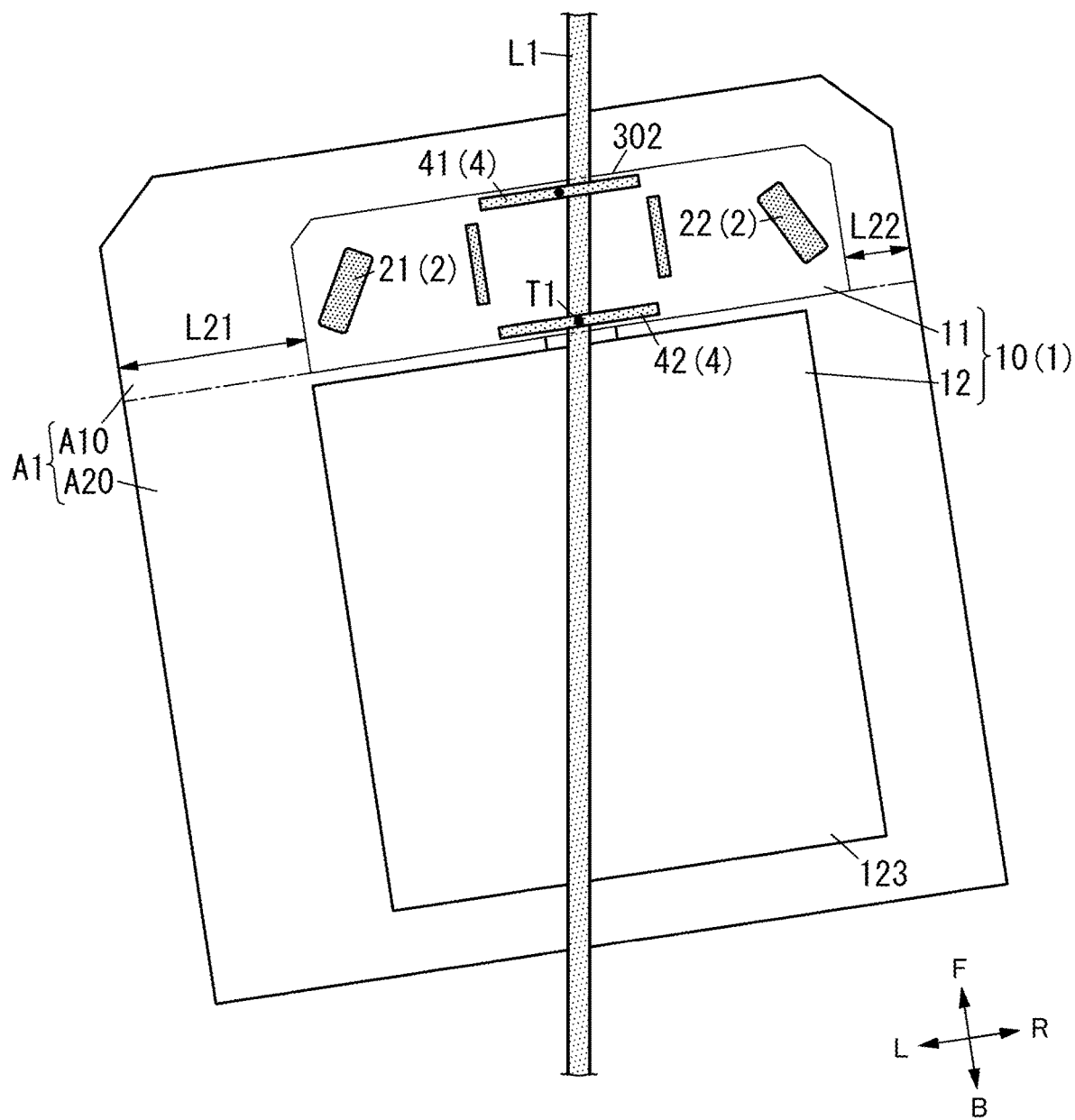
FIG. 11 is a plan view illustrating an exemplary operation of the mover system.

The object detection area A1 does not have to have a hexagonal shape in a top view as shown in FIGS. 10 and 11 but may be changed as appropriate. For example, the object detection area A1 may also have a circular or elliptical shape.

The range of the object detection area A1 in the forward/backward direction and the rightward/leftward direction may vary from one level to another in the upward/downward direction. That is to say, the object detection area A1 may be a three-dimensional region. For example, if the height of the burden 12 is greater than the height of the carrier 11, then the object detection area A1 may include a first region surrounding the carrier 11 and the burden 12 and a second region provided to surround the burden 12 and located over the first region.

The area setting unit 512 may acquire information about the dimensions of the burden 12 and change the size and the shape of the object detection area A1 in accordance with the information thus acquired.

The area setting unit 512 may change the degree of expansion of the object detection area A1 according to the velocity of the mover 1 that is turning. For example, the higher the velocity of the mover 1 turning is, the more significantly the area setting unit 512 may increase the degree of expansion of the object detection area A1 in the direction to which the mover 1 is turning.

The area setting unit 512 may shrink the object detection area A1 in a direction opposite from the direction to which the mover 1 is turning.

When the mover 1 turns to the right or to the left, the area setting unit 512 may expand the object detection area A1 both to the right and to the left.

The area setting unit 512 may change the size and shape of the object detection area A1 depending on a situation where the mover 1 is used. For example, if the mover 1 is moving through a narrow passageway, an object such as a wall located at an end of the passageway may enter the object detection area A1 and be detected to possibly cause the mover 1 to slow down to a low velocity or bring the mover 1 to a halt. Thus, in such a situation, the object detection area A1 is suitably narrowed compared to a situation where the mover 1 is moving through a wide passageway. Likewise, when a battery built in the mover 1 is connected to a charger to charge the battery and when the burden 12 is handed to another mover, either the charger or the other mover needs to be accessed, and therefore, the object detection area A1 is suitably narrowed.

The mover system 10 according to the present disclosure includes a computer system. The computer system includes, as principal hardware components, a processor and a memory. Some functions of the mover system 10 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of the functions of the mover system 10 are integrated together in a single device. However, this is only an example and should not be construed as limiting. Alternatively, those constituent elements (or functions) of the mover system 10 may be distributed in multiple different devices. For example, some functions of the control unit 51 may be performed by the high-order system 7. Still alternatively, at least some functions of the mover system 10 (e.g., some functions of the control unit 51) may be implemented as a cloud computing system as well.

Conversely, the plurality of functions distributed in multiple devices in the embodiment described above may be aggregated together in a single device. For example, the multiple functions distributed in the high-order system 7 and the mover system 10 may be aggregated together in a single device.

(Recapitulation)

The embodiment and its variations described above may be specific implementations of the following aspects of the present disclosure.

A control method according to a first aspect is a method for controlling a mover (1) to move on a traveling surface (B1). The mover (1) includes a plurality of sensors (4, 122) and a plurality of drive wheels (2). A first sensor, selected from the plurality of sensors (4, 122), detects, when a first detection range overlaps with a trajectory (L1), a position of the trajectory (L1) within the first detection range. The trajectory (L1) is provided on the traveling surface (B1) to guide the mover (1). A second sensor, selected from the plurality of sensors (4, 122) and different from the first sensor, detects, when a second detection range overlaps with the trajectory (L1), a position of the trajectory (L1) within the second detection range. A third sensor, selected from the plurality of sensors (4, 122) and different from the second sensor, detects, when a third detection range overlaps with the trajectory (L1), a position of the trajectory (L1) within the third detection range. The control method includes a first turning step and a second turning step. The first turning step includes controlling the plurality of drive wheels (2) to make the mover (1) turn around a position (P1) where the first detection range overlaps with the trajectory (L1) until the second sensor senses, in a state where the first detection range overlaps with the trajectory (L1), a state where the trajectory (L1) is present at a first target position (T1) within the second detection range. The second turning step includes controlling, after the first turning step has been performed, the plurality of drive wheels (2) to make the mover (1) turn around the first target position (T1) until the third sensor senses a state where the trajectory (L1) is present at a second target position (T2) within the third detection range.

According to this configuration, the mover (1) is roughly aligned through the first turning step and then aligned more finely through the second turning step. This improves the alignment accuracy of the mover (1) with respect to the trajectory (L1), compared to attempting to align the mover (1) by turning the mover (1) only once.

A control method according to a second aspect, which may be implemented in conjunction with the first aspect, further includes a turnaround step. The turnaround step includes making, after the second turning step has been performed, each of the plurality of drive wheels (2) change its rolling direction (D1, D2) on the spot such that the rolling direction (D1, D2) of each of the plurality of drive wheels (2) turns into a desired direction.

This configuration allows the mover (1) to move in any direction from the trajectory (L1).

In a control method according to a third aspect, which may be implemented in conjunction with the second aspect, the turnaround step includes defining the desired direction to be a direction in which the rolling direction (D1, D2) of each of the plurality of drive wheels (2) is aligned with the trajectory (L1).

According to this configuration, after the mover (1) has turned, the plurality of drive wheels (2) are turned around along the trajectory (L1). This reduces the angular change of the plurality of drive wheels (2) compared to a situation where the plurality of drive wheels (2) are turned around from a state where the rolling direction (D1, D2) of the plurality of drive wheels (2) is perpendicular to the trajectory (L1). This may reduce the degree of misalignment of the mover (1) involved with the turnaround. Consequently, this further improves the alignment accuracy of the mover (1) with respect to the trajectory (L1).

In a control method according to a fourth aspect, which may be implemented in conjunction with the third aspect, the turnaround step includes defining the desired direction to be a direction in which each of the plurality of drive wheels (2) is either towed in or towed out.

This configuration contributes to increasing the traveling stability of the mover (1) compared to a situation where the tow angle is 0 degrees.

A control method according to a fifth aspect, which may be implemented in conjunction with any one of the first to fourth aspects, further includes a setting step and a control step. The setting step includes setting, around the mover (1), an object detection area (A1) where an object is to be detected. The control step includes controlling the mover (1) based on a result of detection of the object in the object detection area (A1). The setting step includes expanding, when the mover (1) is turning, the object detection area (A1) in a direction to which the mover (1) is turning.

This configuration facilitates detecting an object that could collide against the mover (1) while the mover (1) is turning.

Note that the features of the second to fifth aspects are inessential to the control method and may be omitted as appropriate.

A program according to a sixth aspect is designed to cause one or more processors to perform the control method according to any one of the first to fifth aspects. The sixth aspect may also be implemented as a non-transitory storage medium that stores such a program thereon.

This configuration improves the alignment accuracy of the mover (1) with respect to the trajectory (L1).

A mover system (10) according to a seventh aspect includes a mover (1) and a control unit (51). The mover (1) includes a plurality of sensors (4, 122) and a plurality of drive wheels (2). The control unit (51) controls the plurality of drive wheels (2) to make the mover (1) move on a traveling surface (B1). A first sensor, selected from the plurality of sensors (4, 122), detects, when a first detection range overlaps with a trajectory (L1), a position of the trajectory (L1) within the first detection range. The trajectory (L1) is provided on the traveling surface (B1) to guide the mover (1). A second sensor, selected from the plurality of sensors (4, 122) and different from the first sensor, detects, when a second detection range overlaps with the trajectory (L1), a position of the trajectory (L1) within the second detection range. A third sensor, selected from the plurality of sensors (4, 122) and different from the second sensor, detects, when a third detection range overlaps with the trajectory (L1), a position of the trajectory (L1) within the third detection range. The control unit (51) performs a first turning step and a second turning step. The first turning step includes controlling the plurality of drive wheels (2) to make the mover (1) turn around a position (P1) where the first detection range overlaps with the trajectory (L1) until the second sensor senses, in a state where the first detection range overlaps with the trajectory (L1), a state where the trajectory (L1) is present at a first target position (T1) within the second detection range. The second turning step includes controlling, after the first turning step has been performed, the plurality of drive wheels (2) to make the mover (1) turn around the first target position (T1) until the third sensor senses a state where the trajectory (L1) is present at a second target position (T2) within the third detection range.

This configuration improves the alignment accuracy of the mover (1) with respect to the trajectory (L1).

In a mover system (10) according to an eighth aspect, which may be implemented in conjunction with the seventh aspect, the mover (1) includes a burden (12) and a carrier (11) to carry the burden (12). The burden (12) includes at least one sensor (122) out of the plurality of sensors (4, 122).

According to this configuration, the burden (12) includes the sensor (122), and therefore, the alignment accuracy of the burden (12) may be improved.

In a mover system (10) according to a ninth aspect, which may be implemented in conjunction with the seventh or eighth aspect, the second sensor and the third sensor are arranged side by side in a direction in which the mover (1) travels when two predetermined drive wheels (2), out of the plurality of drive wheels (2), have their respective center axes aligned with each other.

According to this configuration, the orientation of the mover (1) may be made perpendicular to the respective center axes of the two drive wheels (2) by performing the first turning step and the second turning step.

In a mover system (10) according to a tenth aspect, which may be implemented in conjunction with the ninth aspect, the first sensor is arranged more distant than the second sensor when viewed from a tip (123) of the mover (1) in the direction in which the mover (1) travels when the two predetermined drive wheels (2), out of the plurality of drive wheels (2), have their respective center axes aligned with each other.

According to this configuration, the position of the tip (123) of the mover (1) in its traveling direction varies to a lesser degree when the second turning step is performed after the first turning step, rather than when the first turning step is performed. This further improves the alignment accuracy of the mover (1) with respect to the trajectory (L1).

In a mover system (10) according to an eleventh aspect, which may be implemented in conjunction with any one of the seventh to tenth aspects, the control unit (51) further performs a turnaround step. The turnaround step includes making, after the control unit (51) has performed the second turning step, each of the plurality of drive wheels (2) change its rolling direction (D1, D2) on the spot such that the rolling direction (D1, D2) of each of the plurality of drive wheels (2) turns into a desired direction.

This configuration allows the mover (1) to move in any direction from trajectory (L1).

In a mover system (10) according to a twelfth aspect, which may be implemented in conjunction with the eleventh aspect, the turnaround step includes defining the desired direction to be a direction in which the rolling direction (D1, D2) of each of the plurality of drive wheels (2) is aligned with the trajectory (L1).

According to this configuration, after the mover (1) has turned, the plurality of drive wheels (2) are turned around along the trajectory (L1). This reduces the angular change of the plurality of drive wheels (2) compared to a situation where the plurality of drive wheels (2) are turned around from a state where the rolling direction (D1, D2) of the plurality of drive wheels (2) is perpendicular to the trajectory (L1). This may reduce the degree of misalignment of the mover (1) involved with the turnaround. Consequently, this further improves the alignment accuracy of the mover (1) with respect to the trajectory (L1).

In a mover system (10) according to a thirteenth aspect, which may be implemented in conjunction with the twelfth aspect, the turnaround step includes defining the desired direction to be a direction in which each of the plurality of drive wheels (2) is either towed in or towed out.

This configuration contributes to increasing the traveling stability of the mover (1) compared to a situation where the tow angle is 0 degrees.

In a mover system (10) according to a fourteenth aspect, which may be implemented in conjunction with any one of the seventh to thirteenth aspects, the control unit (51) further performs a setting step and a control step. The setting step includes setting, around the mover (1), an object detection area (A1) where an object is to be detected. The control step includes controlling the mover (1) based on a result of detection of the object in the object detection area (A1). The setting step includes expanding, when the mover (1) is turning, the object detection area (A1) in a direction to which the mover (1) is turning.

This configuration facilitates detecting an object that could collide against the mover (1) while the mover (1) is turning.

In a mover system (10) according to a fifteenth aspect, which may be implemented in conjunction with the fourteenth aspect, the mover (1) includes a burden (12) and a carrier (11) to carry the burden (12). The object detection area (A1) includes: a carrier area (A10) including a first buffer area surrounding the carrier (11); and a burden area (A20) including a second buffer area surrounding the burden (12). The control unit (51) performs the setting step including expanding, when the mover (1) is turning, the carrier area (A10) in a direction to which the carrier (11) is turning and expanding the burden area (A20) in a direction to which the burden (12) is turning.

This configuration further facilitates detecting an object that could collide against the mover (1) while the mover (1) is turning.

Note that the constituent elements of the eighth to fifteenth aspects are inessential to the mover system (10) and may be omitted as appropriate.

A parts mounting system according to a sixteenth aspect includes the mover system (10) according to any one of the seventh to fifteenth aspects and at least one parts mounter (9). The parts mounter (9) mounts parts onto a board. The parts mounter (9) includes: a parts feeder (F1) to feed the parts; and a mounter body (8) including a mount head. The mount head mounts the parts, fed from the parts feeder (F1), onto the board. The parts feeder (F1) is carried to the mounter body (8) as the mover (1) of the mover system (10) moves along the trajectory (L1).

This configuration improves the alignment accuracy of the mover (1) with respect to the trajectory (L1). This allows the mover (1) to carry the parts feeder (F1) to the mounter body (8) more easily.

Note that these are only exemplary aspects of the present disclosure. Rather, various configurations (including variations) of the mover system (10) according to the embodiments may also be implemented as a control method and a program.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A control method for controlling a mover, the mover including a plurality of sensors and a plurality of drive wheels and configured to move on a traveling surface,
   a first sensor, selected from the plurality of sensors, being configured to, when a first longitudinal detection range overlaps with a trajectory provided on the traveling surface to guide the mover along the trajectory, detect a first position of the trajectory within the first longitudinal detection range,
   a second sensor, selected from the plurality of sensors and different from the first sensor, being configured to, when a second longitudinal detection range of the second sensor overlaps with the trajectory, detect a second position of the trajectory within the second longitudinal detection range,
   a third sensor, selected from the plurality of sensors and different from the second sensor, being configured to, when a third longitudinal detection range of the third sensor overlaps with the trajectory, detect a position of the trajectory within the third longitudinal detection range,
   the control method comprising:
   a first turning step including controlling the plurality of drive wheels to make the mover turn around the first position where the first longitudinal detection range overlaps with the trajectory until the second sensor senses, in a state where the first longitudinal detection range overlaps with the trajectory, a state where the trajectory is present at a first target position within the second longitudinal detection range; and
   a second turning step including controlling, after the first turning step has been performed, the plurality of drive wheels to make the mover turn around the first target position until the third sensor senses a state where the trajectory is present at a second target position within the third longitudinal detection range.

2. The control method of claim 1, further comprising a turnaround step including making, after the second turning step has been performed, each of the plurality of drive wheels change its rolling direction on the spot such that the rolling direction of each of the plurality of drive wheels turns into a desired direction.

3. The control method of claim 2, wherein
   the turnaround step includes defining the desired direction to be a direction in which the rolling direction of each of the plurality of drive wheels is aligned with the trajectory.

4. The control method of claim 3, wherein
   the turnaround step includes defining the desired direction to be a direction in which each of the plurality of drive wheels is either towed in or towed out.

5. The control method of claim 1, further comprising:
   a setting step including setting, around the mover, an object detection area where an object is to be detected; and
   a control step including controlling the mover based on a result of detection of the object in the object detection area, wherein
   the setting step includes expanding, when the mover is turning, the object detection area in a direction to which the mover is turning.

6. A non-transitory storage medium storing thereon a program designed to cause one or more processors to perform the control method of claim 1.

7. A mover system comprising:
   a mover including a plurality of sensors and a plurality of drive wheels; and
   a control unit configured to control the plurality of drive wheels to make the mover move on a traveling surface,
   a first sensor, selected from the plurality of sensors, being configured to, when a first longitudinal detection range overlaps with a trajectory provided on the traveling surface to guide the mover, detect a position of the trajectory within the first longitudinal detection range,
   a second sensor, selected from the plurality of sensors and different from the first sensor, being configured to, when a second longitudinal detection range overlaps with the trajectory, detect a position of the trajectory within the second longitudinal detection range,
   a third sensor, selected from the plurality of sensors and different from the second sensor, being configured to, when a third longitudinal detection range overlaps with the trajectory, detect a position of the trajectory within the third longitudinal detection range,
   the control unit performing:
   a first turning step including controlling the plurality of drive wheels to make the mover turn around a position where the first longitudinal detection range overlaps with the trajectory until the second sensor senses, in a state where the first longitudinal detection range overlaps with the trajectory, a state where the trajectory is present at a first target position within the second longitudinal detection range; and
   a second turning step including controlling, after the first turning step has been performed, the plurality of drive wheels to make the mover turn around the first target position until the third sensor senses a state where the trajectory is present at a second target position within the third longitudinal detection range.

8. The mover system of claim 7, wherein
the first sensor comprises a plurality of sensor elements arranged in a first longitudinal direction,
the second sensor comprises a plurality of sensor elements arranged in a second longitudinal direction,
the third sensor comprises a plurality of sensor elements arranged in a third longitudinal direction,
the mover includes a burden and a carrier configured to carry the burden, and
the burden includes at least one of the plurality of sensors.

9. The mover system of claim 7, wherein
the second sensor and the third sensor are arranged side by side in a direction in which the mover travels when two predetermined drive wheels, out of the plurality of drive wheels, have their respective center axes aligned with each other.

10. The mover system of claim 9, wherein
the first sensor is arranged more distant than the second sensor when viewed from a tip of the mover in the direction in which the mover travels when the two predetermined drive wheels, out of the plurality of drive wheels, have their respective center axes aligned with each other.

11. The mover system of claim 7, wherein
the control unit further performs a turnaround step including making, after the control unit has performed the second turning step, each of the plurality of drive wheels change its rolling direction on the spot such that the rolling direction of each of the plurality of drive wheels turns into a desired direction.

12. The mover system of claim 11, wherein
the turnaround step includes defining the desired direction to be a direction in which the rolling direction of each of the plurality of drive wheels is aligned with the trajectory.

13. The mover system of claim 12, wherein
the turnaround step includes defining the desired direction to be a direction in which each of the plurality of drive wheels is either towed in or towed out.

14. The mover system of claim 7, wherein
the control unit further performs:
a setting step including setting, around the mover, an object detection area where an object is to be detected; and
a control step including controlling the mover based on a result of detection of the object in the object detection area, wherein
the setting step includes expanding, when the mover is turning, the object detection area in a direction to which the mover is turning.

15. The mover system of claim 14, wherein
the mover includes a load and a carrier configured to carry the load,
the object detection area includes: a carrier area including a first margin area surrounding the carrier; and a load area including a second margin area surrounding the load, and
the control unit performs the setting step including expanding, when the mover is turning, the carrier area in a direction to which the carrier is turning and expanding the load area in a direction to which the load is turning.

16. A parts mounting system comprising:
the mover system of claim 7; and
at least one parts mounter configured to mount parts onto a circuit board,
the parts mounter including:
a parts feeder configured to feed the parts to a mounter body; and
the mounter body including a mount head configured to mount the parts, fed from the parts feeder, onto the circuit board,
the parts feeder being carried to the mounter body as the mover of the mover system moves along the trajectory.

17. The control method of claim 2, further comprising:
a setting step including setting, around the mover, an object detection area where an object is to be detected; and
a control step including controlling the mover based on a result of detection of the object in the object detection area, wherein
the setting step includes expanding, when the mover is turning, the object detection area in a direction to which the mover is turning.

18. The control method of claim 3, further comprising:
a setting step including setting, around the mover, an object detection area where an object is to be detected; and
a control step including controlling the mover based on a result of detection of the object in the object detection area, wherein
the setting step includes expanding, when the mover is turning, the object detection area in a direction to which the mover is turning.

19. The control method of claim 4, further comprising:
a setting step including setting, around the mover, an object detection area where an object is to be detected; and
a control step including controlling the mover based on a result of detection of the object in the object detection area, wherein
the setting step includes expanding, when the mover is turning, the object detection area in a direction to which the mover is turning.

20. The mover system of claim 8, wherein
the second sensor and the third sensor are arranged side by side in a direction in which the mover travels when two predetermined drive wheels, out of the plurality of drive wheels, have their respective center axes aligned with each other.

* * * * *